United States Patent
Chan et al.

(10) Patent No.: US 6,346,938 B1
(45) Date of Patent: Feb. 12, 2002

(54) COMPUTER-RESIDENT MECHANISM FOR MANIPULATING, NAVIGATING THROUGH AND MENSURATING DISPLAYED IMAGE OF THREE-DIMENSIONAL GEOMETRIC MODEL

(75) Inventors: Ellery Y. Chan, Palm Bay; Timothy B. Faulkner, Melbourne, both of FL (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 09/300,577

(22) Filed: Apr. 27, 1999

(51) Int. Cl.[7] .............................................. G06F 15/00
(52) U.S. Cl. ...................................................... 345/419
(58) Field of Search ................................ 345/419, 423, 345/424, 427, 629, 630

(56) References Cited

U.S. PATENT DOCUMENTS

| | | | | |
|---|---|---|---|---|
| 4,360,831 A | * | 11/1982 | Kellar ........................ 358/182 |
| 4,600,200 A | | 7/1986 | Oka et al. .................... 273/313 |
| 4,631,691 A | | 12/1986 | Pica ............................. 364/521 |
| 4,646,075 A | | 2/1987 | Andrews et al. ............ 340/747 |
| 4,727,365 A | | 2/1988 | Bunker et al. ............... 340/728 |
| 5,276,785 A | | 1/1994 | Mackinlay et al. .......... 395/127 |
| 5,359,703 A | | 10/1994 | Robertson et al. .......... 395/119 |
| 5,422,989 A | | 6/1995 | Bell et al. ..................... 395/133 |
| 5,608,850 A | | 3/1997 | Robertson .................... 395/127 |
| 5,689,628 A | | 11/1997 | Robertson .................... 395/127 |
| 5,808,613 A | | 9/1998 | Marrin et al. ................ 345/355 |

\* cited by examiner

Primary Examiner—Phu K. Nguyen
(74) Attorney, Agent, or Firm—Allen, Dyer, Doppelt Mlibrath & Gilchrist, P.A.

(57) ABSTRACT

An image processing system renders, displays and provides virtual user navigation through multiple size and aspect views of a three-dimensional (3D) geometric model of an object, such as an urban scene. A user interface, such as a mouse or joystick device, is coupled to a digital image processor and is employed to supply image manipulation signals to the digital image processor for manipulating images displayed upon a digital image display device. The digital image display device contains an overview display window that displays the object from a 'bird's eye' or map perspective, and an inset display window that displays the object from a 'down inside the scene' perspective. In response to user interface-sourced commands, the processor can swap the two image perspectives and/or controllably navigate through the inset image.

46 Claims, 20 Drawing Sheets

COMPUTER-RESIDENT MECHANISM FOR MANIPULATING, NAVIGATING THROUGH AND MENSURATING DISPLAYED IMAGE OF THREE-DIMENSIONAL GEOMETRIC MODEL

FIELD OF THE INVENTION

The present invention relates to digital image processing systems for rendering and displaying views of three-dimensional (3D) geometric models, and is particularly directed to a computer-resident mechanism that enables a system user to view images generated from 3D geometric information, and to use a convenient user interface such as a joystick and a mouse device, to navigate within animated perspective views of the image as displayed on a high-resolution raster display.

BACKGROUND OF THE INVENTION

Conventional image processing systems for generating and displaying three-dimensional models customarily offer the user the ability to conduct a limited degree of navigation through a scene, including walk/drive/fly navigation with a mouse, or through the use of a joystick device. In such applications, navigation is typically constrained to pre-defined locations, and may or may not employ an interpolation technique to provide smooth motion from a current location to a new location. For an illustration of literature relating to model display and image processing technology, attention may be directed to the Oka et al, U.S. Pat. No. 4,600,200; Pica, U.S. Pat. No. 4,631,691; Andrews et al, U.S. Pat. No. 4,646,075; Bunker et al, U.S. Pat. No. 4,727,365; Mackinlay et al, U.S. Pat. No. 5,276,785; Amano al, U.S. Pat. No. 5,287,093; Robertson al, U.S. Pat. No. 5,359,703; Robertson, U.S. Pat. No. 5,608,850; Robertson, U.S. Pat. No. 5,689,628; and Marrin et al, U.S. Pat. No. 5,808,613.

SUMMARY OF THE INVENTION

In accordance with the present invention, the constrained capabilities of conventional 3D model display systems, such as those referenced above, are effectively obviated by a new and improved versatility digital image processing system, that is effective to controllably render and display multiple aspect and size views of a three-dimensional (3D) geometric model, such as, but not limited to an urban scene, one of which is a map or 'bird's eye' view of the scene, and the other of which displays a relatively close, or 'in-scene' view of the 3D model image. By the use of a user interface, such as a joystick or mouse, the user is not only able to toggle between which of the two scene perspectives is displayed as a map view and which is displayed up close for in-scene navigation, but may readily navigate within the virtual world of the in-scene view of the displayed 3D image.

For this purpose, the image processing system architecture of the present invention includes a host computer having an associated high resolution display, and one or more associated user interface devices (e.g., mouse and/or joystick), through which the user controls manipulation of and navigation through images generated on the display. To facilitate manipulation of and navigation through a 3D model, such as 'street level' movement through an urban scene, the viewing screen of the display is divided into two viewports, which display respectively different magnification views of an image of the 3D model, from points in three-dimensional space that are respectively 'down inside' and 'away from' the scene.

A first or main viewport may comprise a relatively large region of the display screen, while a second or inset viewport may comprise a relatively small region that overlaps or is superimposed on the main viewport portion. As noted above, one of the viewports will display a map or 'bird's eye' view of the scene, while the other viewport will display a relatively close, or 'in-scene' view of the 3D model image, and the user may toggle between the two scene perspectives. Operation of the user interface produces input parameters that control navigation within the in-scene view of the displayed 3D image.

The user may change the 3D location and orientation of a user virtual representation icon. The user icon is a software generated object that is superimposed on the displayed image to represent the user's location and orientation within the displayed 3D model. As the user manipulates the icon, an interpolation mechanism is accessed to supply control information to a 'view camera' operator, outputs of which are employed to create the 3D scene and to render the view, as the view is coupled to a viewport, which defines the overview and in-scene presentations of the image to the respective viewports.

The overview view of a geographic scene is preferably displayed in a fixed (e.g., North-up) orientation, and is rendered as a 3D perspective map view of the virtual world. Navigation within this 'far away' plan view is generally limited, and operation of the user interface moves the user location horizontally and vertically in the display, or at a constant altitude within the image. The overview image maintains the user location in the center of the viewport, so that changing the user location will cause the overview image to pan in the direction opposite the user's motion. The user may change the altitude of the overview viewpoint, to provide a magnification and demagnification action, which essentially allows the user to 'zoom into' or 'zoom out' of the scene.

The in-scene view is a less constrained 3D perspective view, and directly represents what would be seen by a user located in the virtual world of the 3D model. The user's line-of-sight or viewing direction may be directed at, or close to, horizontal, or it may inclined upwardly or downwardly at any elevation angle, and may face any azimuth angle (compass direction). This closely approximates how an upright human is able to view his/her surroundings within the 3D scene. The in-scene view will be typically from near-ground-level, as in the case of an urban street scene for example, but is not constrained to be so. It may be from any aspect to which the user navigates.

There are two modes of navigation that the user can perform in the in-scene view: 1) joystick mode and 2) mouse mode. In joystick mode, the user moves the joystick handle and operates buttons on the handle to control user location within the virtual 3D world. In mouse mode, the user clicks on a new vantage or 'look-from' point, and then an appropriate target or 'look-at' point. The look-at point is employed to orient the user as though standing at the new vantage point. To select a new vantage point, the mouse pointer is placed within the main viewport, and the left mouse button is actuated. The new look-at point is selected while the user continues to hold the left mouse button down, and moves the mouse pointer. In both of these steps the mouse pointer is positioned on the actual 3D model displayed in the main viewport.

In the course of navigating through or otherwise manipulating the image, an interpolation operator is used to effect a gradual or smooth transition of the image between its starting and target locations. In addition, each viewing camera location/orientation is updated by the interpolation function assigned to it. Different interpolation functions may be assigned to a camera at different times.

As pointed out above, the user may operate a pushbutton on the user interface to 'toggle' between the two scene perspectives displayed by the respective main and inset viewports. The two views are mutually synchronized, so that the viewing cameras move in a coordinated fashion to swap view locations, as the two viewports exchange their respective display roles. The user may toggle between the two views at any time, even during the transition initiated by a previous toggle state change. In this latter case, the motion simply reverses and the viewpoints begin returning to their immediately previous locations. Since the toggling mechanism of the invention cause the two views to be swapped simply and smoothly, user distraction is minimized, so as to facilitate the user retaining a mental picture of his/her location in the virtual world.

A principal benefit of this feature of the invention is that it allows a user at street level in an urban scene to readily and easily ascend or rise to a higher vantage point, in order to realize a better sense of location within the scene. This permits the user to ascend fully to the overview map viewpoint, or to rise up just far enough to realize where he/she is, and then immediately return to street level of the virtual 3D image. This feature also provides a convenient mix of close-up, on-the-street navigation with longer-range navigation. The user on-the-street can 'pop up' to the overview viewpoint, roam quickly to a distant part of the scene, and then descend back to street level in the new location. It additionally avoids the problem of having to provide appropriate scale factors to a single navigation model for both close-up and long-range motions, and avoids the distraction of forcing the user to decide when to use one or the other.

In addition to swapping views, the user may navigate through a view, using either the joystick or mouse to manipulate the user's location and orientation within the scene. Advantages of this user icon transition mechanism include the fact that only a single press/drag/release mouse operation is required to position the user icon at a predetermined location (e.g., height above a point on a surface) within the 3D scene, orient the user icon, set the viewing direction, and set the look-at point to another point on a target surface within the scene. The user's viewpoint will not change within the window until the operation is complete. This allows the other view to present a preview of the user's new viewpoint. Moreover, as will be described, this same interaction and visual representation can be employed for mensuration.

Pursuant to a further feature, the invention provides a reduced complexity user icon having a visual representation that conveys several pieces of information to the user. A first is the location of the user's head, or viewpoint in the virtual world. In a non-limiting but preferred implementation, the user icon's head may be represented by a colored (e.g., red) sphere. Second, the heading or line-of-sight of the user corresponds to the 'forward' direction faced by the user toward a look-at point in his/her local frame of reference.

The look-at point may be represented by a (yellow) cube whose center is placed at the looked-at point in the 3D scene. The look-at point also determines the center of the base of a semi-transparent (blue) cone. Heading (view direction, or the azimuth and elevation of the view) may be indicated in the displayed image by the axis of the cone. The apex of the cone touches the surface of the sphere, and the 'boresight' axis lies along a ray from the center of the sphere through the point of intersection of the cone apex with the sphere's surface. The user's field of view is defined by the angle subtended by the cone. Because a cone is used, the field of view indication only approximates what is seen in the displayed rectangular viewport. For a more accurate representation a rectangular frustum whose cross section matches the aspect ratio of the viewport may be used.

In accordance with a mensuration mode aspect of the invention, the cone is not displayed. Instead, a line or very narrow cylinder may be used to connect the user icon head and the look-at point. The distance to the look-at point being viewed corresponds to the height of the cone along the line-of-sight axis from the center of the sphere to the base of the cone. The tallness of the user may be represented by a thin cylinder or leg whose axis is vertical and whose upper end terminates at the center of the sphere. The base of the leg corresponds to the observer's foot location (on the ground). This facilitates measurements by placing the user icon on a surface such as the ground, to determine the vertical offset of the viewpoint above the surface.

The distance between the user icon foot and the icon head may be made adjustable, rather than fixed. The user icon can then be used to approximate human viewing characteristics, by placing the icon in a standing position on a surface in the scene (e.g. on the sidewalk of a city street), and looking outward from some distance above the surface. The variable height of the user icon does not affect its ability to be translated up or down any amount in the scene.

As an alternative shape the features of the user icon may be incorporated into a more 'human'-looking iconic representation, to provide the additional benefit of a familiar scale of reference, that the human user could employ as an additional visual cue, to aid in estimating the sizes of objects within the scene. The user icon may also be employed for navigation under mouse control and for mensuration.

When conducting mensuration, dimensions of features within the image viewed by the user in the main viewport can be measured. In this mode, moving the user location/orientation interactively allows the user to select respective proxy vantage and look-at points. During the selection process, a mensuration icon is displayed between the proxy vantage and look-at points. In addition, the display may show parametric values associated with distance between the proxy vantage and look-at points, change in horizontal distance, and change in vertical distance next to the mouse pointer. Upon completion of the proxy viewpoint specification, the user's viewpoint does not change, as when moving to a new location. This allows the user to measure additional features within the displayed 3D image.

Advantages of the mensuration feature of the invention include the use of a only single press/drag/release mouse operation for measuring any feature that can be seen within the 3D scene from the main viewport. Displaying a mensuration icon provides the user with visual feedback of what is being measured, along with distance information aligned with the mouse pointer. This enables the user to focus on the mensuration technique, without having to look elsewhere for distance information. A same mensuration menu item may be selected to place the user back into the normal viewpoint selection mode.

In accordance with an additional load management feature of the invention, objects may be selectively introduced into or removed from the displayed scene. This feature may be employed, for example, if an object occludes a prescribed portion of the scene, or impedes a user's understanding important aspects of the scene. Pursuant to the invention, and object (such as a building or a city block of an urban scene) may be 'grown' from a (ground) surface of the scene, or it may be 'translated' vertically from a location beneath the ground surface into the scene. A model unit may be also be gradually animated out of or 'unloaded' from the scene, by reversing the steps through which it was previously introduced. The geometry of the unloaded model unit need not be discarded; instead, it may simply be made invisible until it is to be redisplayed.

DETAILED DESCRIPTION

Figure 1:
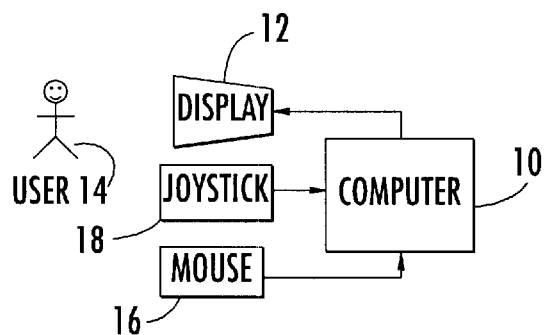
FIG. 1 diagrammatically illustrates the overall system architecture of an image processing system in accordance with the present invention.

Before describing in detail the digital image manipulation and navigation system of the present invention, it should be observed that the invention resides primarily in new and improved functionality of digital image processing application software that is readily executable within a conventional computer hardware system having a high resolution display and standard user interface components, such as joystick and mouse devices, through which the user may gain access to and control the operation of the computer for the desired manipulation of and navigation through displayed images.

Consequently, in order to avoid obscuring the present disclosure with details, which will be readily apparent to those skilled in the art having benefit of the description herein, system configuration and operation, as well as the functionality of the image processing software of a non-limiting implementation of the invention have, for the most part, been illustrated in the drawings by readily understandable block diagrams and flow charts, which show only those specific details that are pertinent to an understanding of the invention.

FIG. 1 diagrammatically illustrates the overall system architecture of an image processing system in accordance with the present invention as comprising a host computer 10 having an associated high resolution display 12 for displaying digital images to a user 14. Also shown in FIG. 1 are a mouse 16 and a joystick 18, through which the user 14 controls manipulation of and navigation through images generated on the display 12.

As a non-limiting but preferred embodiment of a system implementation, a suitable example of the computer 10 for executing the image processing mechanism of the invention may comprise a Silicon Graphics O2 desktop workstation running the Irix 6.5.2 operating system. The 'viewer' module of the image processing mechanism of the invention, to be described, may employ the standard Unix and X Window application programming interface (API) obtainable from a variety of vendors, such as but not limited to Sun Microsystems Inc., and Silicon Graphics Inc., and 'Iris Performer' (Ver. 2.3) 3D visual simulation API, which is also obtainable from Silicon Graphics Inc. The 'Iris Performer' API provides the capability to convert a 3D scene described by vertices, polygonal faces described by those vertices, colors, and texture map images into a rasterized projection of the 3D scene. The 3D scenes may be loaded from files containing descriptions in 'OpenInventor' description format (available from Silicon Graphics Inc, or Template Graphics, for example). The mouse device 16 may comprise a conventional three-button system mouse, and the joystick 18 may comprise a BG Systems 'Flybox', which connects to a serial port on the workstation.

Figure 2:
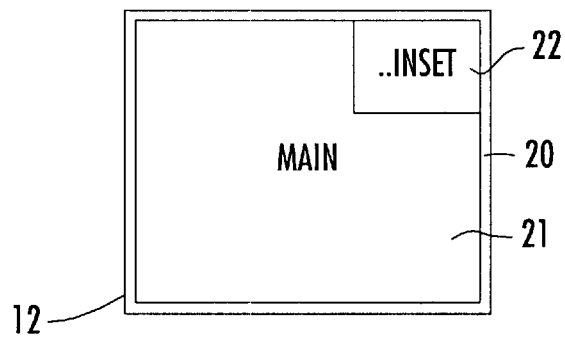
FIG. 2 shows an example of the manner in which the viewing screen of the display of the system of FIG. 1 may be divided into two different sized viewports displaying respectively different magnification views of a 3D scene.

As shown in FIG. 2, the viewing screen 20 of the display 12 is dividable into two rectangular regions or viewports 21 and 22, that are used to display respectively different magnification views of a 3D urban scene from points in three-dimensional space that are relatively near to the scene, so that details of the scene can be observed, and far away from the scene so that a 'bird's eye' view of the scene may be maintained. The first or main viewport 21 may comprise a relatively large display region, while the second or inset viewport 22 may comprise a relatively small viewport that overlaps the main viewport. It should be observed, however, that the invention is not restricted to such relative sizes, and the viewports need not overlap. As will be described, one viewport displays an overview or 'bird's eye' view of the scene, and the other viewport displays a closer 'in-scene' view of the scene. Either of the two viewports 21 and 22 can display either an overview or in-scene view by toggling between views; the user input is defaulted to the main viewport 21. The input is interpreted by whichever view is currently displayed within the main viewport 21. Although not shown as such in the flowcharts to be described below, it may be noted a focus mechanism may be employed to allow either viewport to accept user inputs.

In addition, although main viewport 21 is larger than the inset viewport 22, they both have the capability to display the same view of the 3D scene. It is preferred that the two viewports be displayed in close proximity to one another (e.g., on the same screen), in order to provide a single user with additional information via multiple views of the scene. As non-limiting variations, different viewports may be assigned to different collaborating users, and the viewports may be displayed in separate windows on the same display, or on widely separated display devices.

As pointed out briefly above, control of the image manipulation and navigation system of the invention is effected by means of the user-operated mouse and joystick input devices 16 and 18, respectively. Both devices are used for different aspects of navigation. For purposes of the present description, only the main viewport 21 receives the user's interactive input from both the mouse and joystick. The three-button mouse 16 provides incremental X and Y displacement values and left, middle, and right button state values. Through software the mouse is sampled periodically and the inputs are made available to the computer as a set of values that can be sampled as needed.

Figure 3:
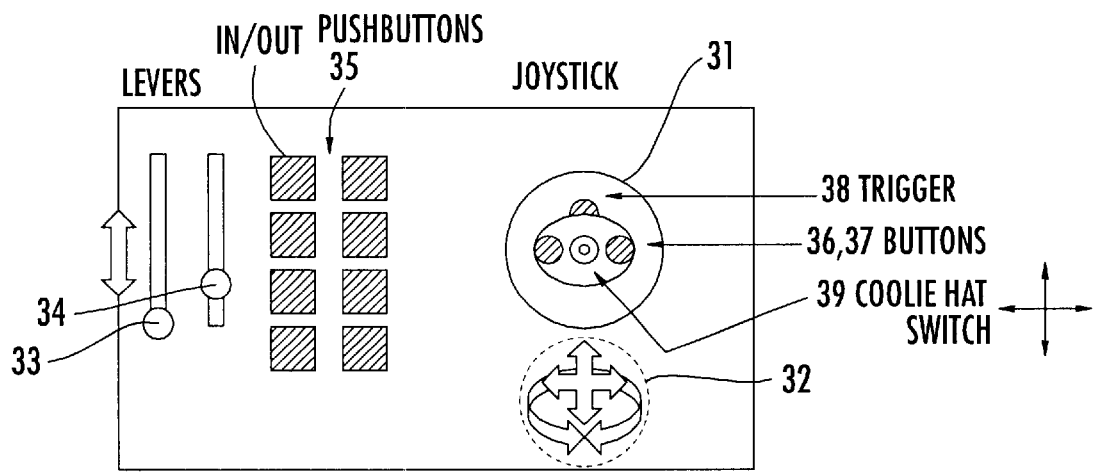
FIG. 3 diagrammatically illustrates a joystick interface.

FIG. 3 diagrammatically illustrates a joystick interface as comprising a main handle 31 that receives X, Y, and twist inputs 32; two single axis analog levers 33, 34; a set 35 of eight pushbuttons that are separate from the joystick; two thumb pushbuttons 36, 37 on the top of the joystick handle; a trigger pushbutton 38 on the joystick handle; and a four-position coolie-hat switch 39 on the top of the joystick handle. Through interface software the various control points of the joystick are sampled periodically and made available to the image processor as a set of values that are sampled as needed.

Figure 4:
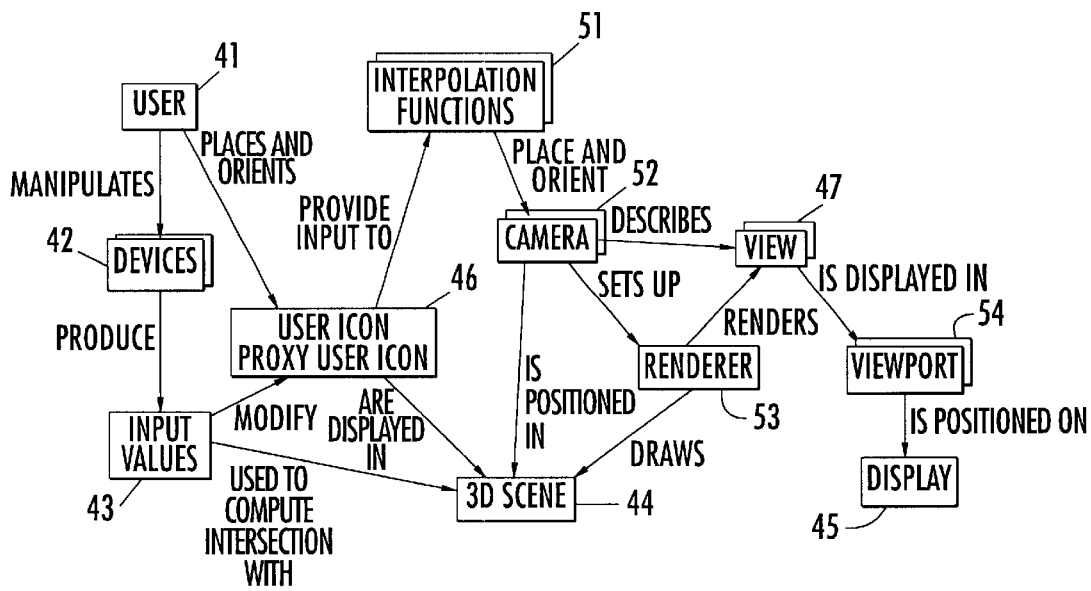
FIG. 4 diagrammatically illustrates the various image processing entities of which the invention is comprised, and their roles and relationships relative to each other.

FIG. 4 diagrammatically illustrates the various image processing entities of which the system of the invention is comprised, and their roles and relationships relative to each other. User 41 corresponds to a human operator, who controls the system by manipulating (mouse/joystick) input devices 42. When the user 41 manipulates the input devices 42, these devices produce input values or parameters 43 that are used to navigate within the virtual world of a 3D image 44 generated on a display 45. During this operation, the user is effectively changing the 3D location and orientation of a user virtual representation icon 46 within the virtual world of the displayed image.

This combination of user location within the virtual 3D image world 44 and user viewing orientation may be termed user location/orientation. The user icon 46 is a software generated object that is superimposed on the displayed image and represents the user's location/orientation within one or more views 47 of the displayed model. Such visual representations are sometimes referred to in virtual reality literature as 'avatars'. To navigate through the scene the user moves or re-orients the icon 46 (thereby changing the user location) within the scene.

As the user manipulates the image, an interpolation mechanism 51 is controllably accessed to supply control information to a view camera operator 52, outputs of which are coupled to the view 47, and a renderer 53. The renderer 53 is employed to create or draw the 3D scene 44 and to render the view 47, while the view is coupled to a viewport 54, which defines the overview and in-scene presentations of the image to the display 45.

One of the two viewports 21 and 22 displays an overview of the scene, while the other viewport displays an in-scene view. As referenced briefly above, the overview view of geographic imagery data, shown in the inset viewport 22 in FIG. 5 and the main viewport 21 in FIG. 6, may comprise a map or plan view of the scene of interest from the perspective of a relatively high altitude directly above the user location 23, which appears in the center of the overview viewport. The overview view of a geographic scene may be presented in a North-up orientation, i.e., with the northerly direction being towards the top of the display, South to the bottom, West to the left, East to the right. The overview orientation serves as an aid in cognition for those who may have studied maps of the geographic area of the scene of interest, and provides a canonical view orientation to which the user can return at any time. Even though such a view is a straight-down map view, it is still rendered as a three dimensional perspective view of the virtual world. Depth (on stereoscopic displays) and perspective foreshortening are discernable for objects of sufficient size and proximity to the viewpoint.

Navigation within the overview view is generally limited. The joystick moves the user location horizontally (at a constant altitude) within the virtual world. Twisting the joystick handle changes the azimuth (line-of-sight viewing direction) of the user orientation. This does not rotate the map view; it maintains a North-up orientation, as described above. As further shown in FIG. 7, pushing forward on the joystick handle moves the user location northward relative to the user location in FIGS. 5 and 6. Pulling back on the joystick will move the user location southward; pushing left moves it westward; and pushing right it moves eastward.

Because the overview view always keeps the user location in the center of the viewport, changing the user location will cause the map view to pan in the direction opposite the user's motion. The two pushbuttons 36, 37 on the joystick handle 31 change the altitude of the overview viewpoint, to provide a magnification and demagnification action, which essentially allows the user to 'zoom into' or 'zoom out' of the scene. The pushbuttons 36 and 37 do not modify the user's location within the displayed scene.

Figure 5:
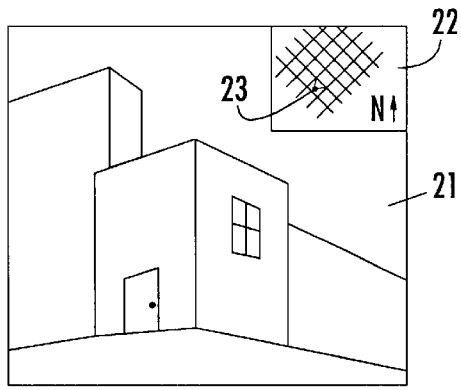
FIG. 5 diagrammatically illustrates the display of overview and in-scene perspectives of an urban scene in respective inset and main viewports of a display.
Figure 6:
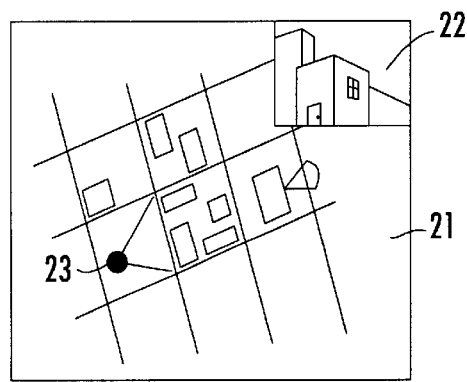
FIG. 6 diagrammatically illustrates a complement viewport display of overview and in-scene perspectives of the urban scene of FIG. 5 in respective main and inset viewports of a display.
Figure 7:
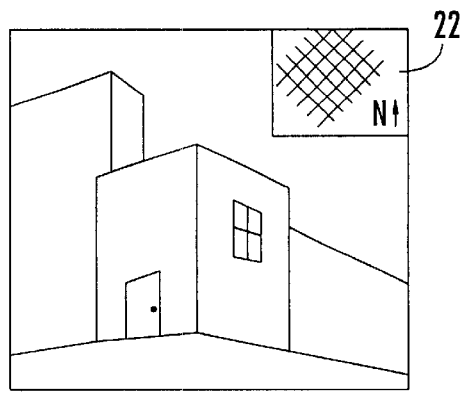
FIG. 7 shows changes in the displayed images in the viewports of FIG. 5, in response to pushing forward on a joystick handle to move the user location northward and forward in the azimuth direction of the view along street level, relative to the user location in FIG. 5.

The in-scene view, shown in the main viewport 21 in FIGS. 5 and 7, and the inset viewport 22 in FIG. 6, is a less constrained 3D perspective view of the virtual world, and directly represents what would be seen from the user location 23 as placed in the scene. The user's line-of-sight or viewing direction may be at or close to horizontal, but it may also be inclined upwardly or downwardly at any elevation angle, and may be facing any azimuth angle (compass direction). This closely approximates how an upright human would typically view his/her surroundings within the 3D scene. Typically, as in the case of an urban street scene for example, the in-scene view will be from near-ground-level, but is not constrained to be so. It may be from any aspect to which the user navigates.

There are two modes of navigation that the user can perform in the in-scene view: 1) joystick mode and 2) mouse mode. In joystick mode, the user operates the joystick handle 31 to move the user location vertically or horizontally in the display at a constant height above a surface of the virtual world. As pointed out above, for the case of an urban street scene as a non-limiting example, the in-scene view will typically be from near-ground-level. As shown in the in-scene perspective view of FIG. 7, pushing forward on the joystick handle moves the user location forward (in the azimuth direction of the view) along street level, relative to the user location in the in-scene view of FIG. 5.

Conversely, pulling back on the joystick will move the user location backward, or 180° from azimuth. Similarly, pushing the joystick to the left moves the user's location to the virtual left, and pushing right moves to the right. Twisting the joystick handle rotates the user azimuth, which will change the meaning of forward, backward, left, and right for all subsequent motions. The magnitude of joystick deflection determines the rate of translation or rotation. All these motions seem quite natural to most people, especially those who have used other joystick-based 3D scene viewers, such as typical joystick-based video games.

In order to travel vertically (up or down) within the in-scene 3D view, the user operates the coolie-hat switch 39. The viewing elevation, that is, the angle of the line-of-sight or look direction relative to horizontal is changed by holding the joystick trigger 38, while operating the coolie-hat switch 39 up or down, so as to raise or lower the elevation angle within the range of −90° to +90°. This affects the view as it would for a human to tilt his/her head up or down.

In accordance with the second or mouse mode of navigation, the user location/orientation may be manipulated with the mouse input device 16. In order to choose a location/orientation, the user first selects a new vantage or 'look-from' point, and then an appropriate target or 'look-at' point. The look-at point is employed to orient the user when standing at the new vantage point. As will be described in detail below, selecting a new vantage point is accomplished by placing the mouse pointer within the main viewport 21, and pressing the left mouse button. The new look-at point is selected while the user continues to hold the left mouse button down, and moves the mouse pointer. In both of these steps the mouse pointer must remain in the main viewport 21 and be located over that portion of the 3D model being displayed (i.e., not up in the sky).

In the course of executing the respective steps of the sub-routines (shown in the flow charts of FIGS. 8–17, to be described) through which manipulation of and navigation through an image is conducted in accordance with the invention, a software object, shown in FIG. 4 as an interpolation operator or state $S_{int}$ 51 may be employed. This interpolation state is a collection of data values comprising a state vector that can be passed to the interpolation functions. Minimally, $S_{int}$ includes the following components: 1) the current user icon location/orientation; 2) the current location/orientation of a 'proxy' user icon (associated with the potential target or destination of the user icon); 3) an INTERPOLATING flag; 4) a PROXY-PLACED flag; 5) the current time—$T_{curr}$; 6) the start time of the interpolation—$T_1$; 7) the duration of the interpolation—$T_{int}$; 8) the elapsed time since the start of the interpolation—$T_x$; 9) other values used as arguments to one or more interpolation functions.

In addition, each camera location/orientation is updated by the interpolation function assigned to it. Different interpolation functions may be assigned to a camera at different times. These interpolation functions are defined as follows:

SET—instantaneously move the camera to the current user icon location/orientation.

FOLLOW—instantaneously orient the camera directly above the user icon location with a downward orientation, so that North is up in the viewport. This is a nadir, North-up, map view. The camera location may be at a fixed altitude, or its altitude may vary based on external factors, such as the height of the user icon, or the height of the terrain surface. In accordance with a preferred embodiment, altitude is one of a fixed number of discrete constant height values, which can be interactively selected by the user.

MOVE-TO—at a finite rate, interpolate from the user icon location/orientation at the start of the interpolation sequence to the proxy user icon location/orientation. The rate may be constant, or may vary (slow-in, slow-out). The rate may differ based on external conditions, such as distance to be traveled.

ASCEND—at a finite rate, interpolate from the user icon location/orientation to the nadir, North-up, map view location/orientation.

DESCEND—at a finite rate, interpolate from the nadir, North-up, map view location/orientation to the user icon location/orientation.

A set of non-limiting examples of respective software modules for implementing the functionality and operation of the image manipulation and navigation methodology of the present invention will now be described with reference to the flow charts of FIGS. 8–17. It should be observed that the invention is not limited to the particular set of operations described and shown, but other image processing software routines which implement the functionality described may be employed.

Figure 8:
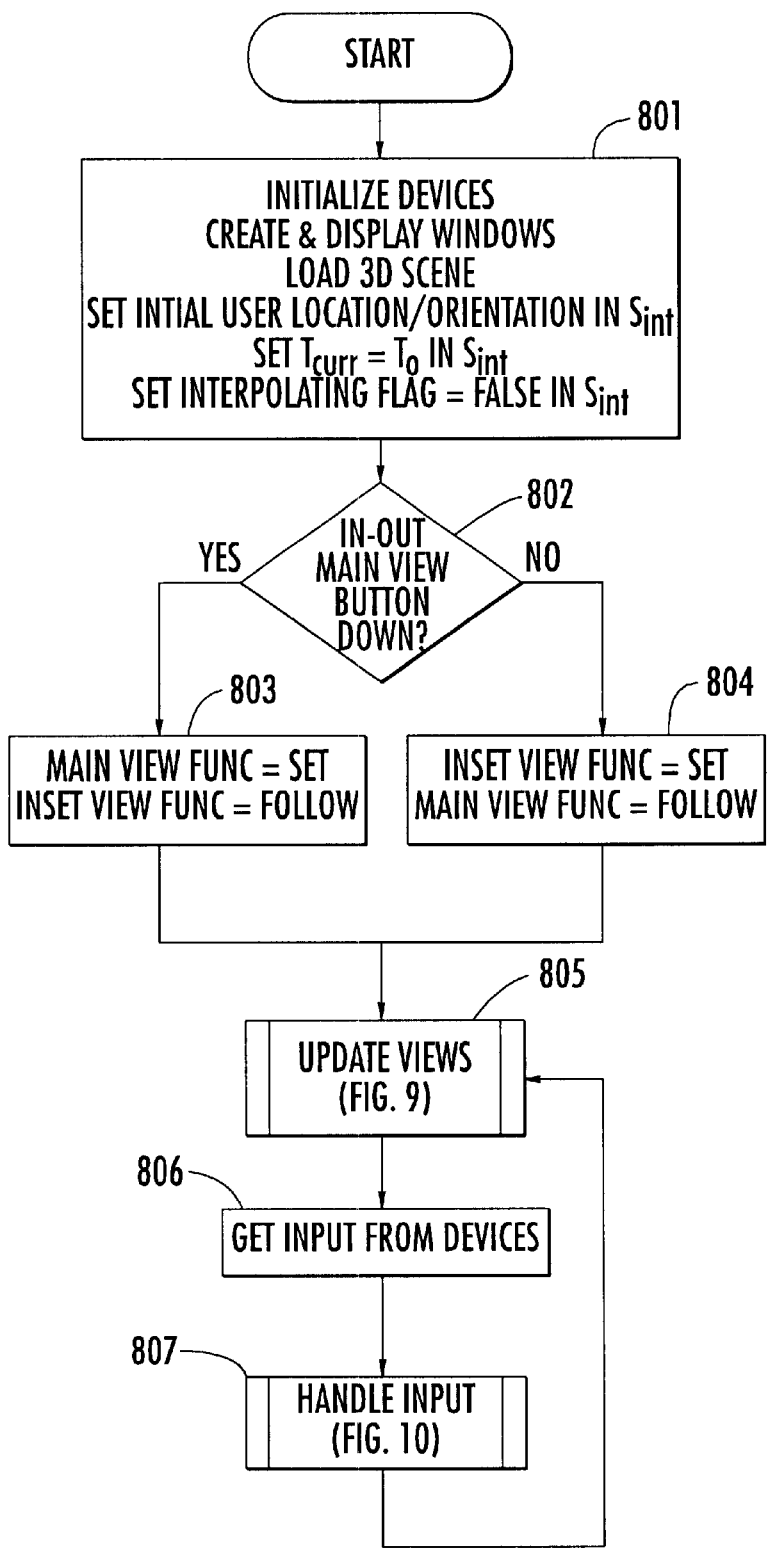
FIG. 8 is a flow chart of the steps of the overall operation of the image viewer employed in the present invention.

Referring initially to FIG. 8, which shows the overall operation of the image viewer, at step 801, the input devices are initialized and the graphical user interface is set up on the display. In addition, the 3D OpenInventor scene description is loaded from one or more files stored on the workstation's hard disk. Further, the initial user icon location/orientation is set, typically at the center of the scene, in the interpolation state $S_{int}$. Also, the current simulation time is initialized at $T_0$ in $S_{int}$, and the INTERPOLATION flag is set as FALSE in $S_{int}$.

Once the system has been initialized, the routine transitions to query step 802, to determine the user's choice of which view (the main view 21 or the inset view 22) is to contain the overview of the image. If the button used to control the view swapping behavior is currently pushed down (the answer to step 802 is YES), the routine transitions to step 803. In step 803, the main view is assigned the SET interpolation function, and the inset view interpolation function is set to FOLLOW.

This is the default in-scene navigation behavior which modifies the user icon location/orientation in a straightforward manner based on input from the joystick. (As described above, pushing forward on the joystick moves the user icon location forward in the scene. Pushing backward moves the user icon backward. Left and right movements behave similarly. Twisting the joystick handle changes the heading of the user icon's view. The amount of joystick displacement is directly proportional to the rate of change of the user icon's location or orientation.)

The FOLLOW function for the inset view causes the overhead map view location and orientation to be calculated based on the location of the user icon in the scene. This function chooses a nadir viewpoint directly above the user icon. The altitude is fixed relative to the ground surface in the scene.

If the answer to query step 802 is NO, namely, the button used to control the view swapping behavior is currently in the up position, the routine transitions to step 804, wherein the roles of the two views are reversed. In this step, the inset view is assigned the SET function, and the main view is assigned the FOLLOW function.

From either of steps 803 and 804, the routine transitions to the update views step 805 (to be described below with reference to the flow chart of FIG. 9), wherein new camera views (viewer line-of-sight look angles) are computed. The camera views are then rendered to the display, and user interface device inputs are obtained for use in the calculation of the user's new location and orientation.

Next, in step 806, the user interface device inputs are sampled for any new inputs from the user. The routine then transitions to the handle input step 807 (to be described below with reference to the flow chart of FIG. 10), wherein input device values are used to place the user icon and proxy user icon within the 3D scene. The locations and orientations of the objects are then used to compute new camera views that are subsequently displayed.

Figure 9:
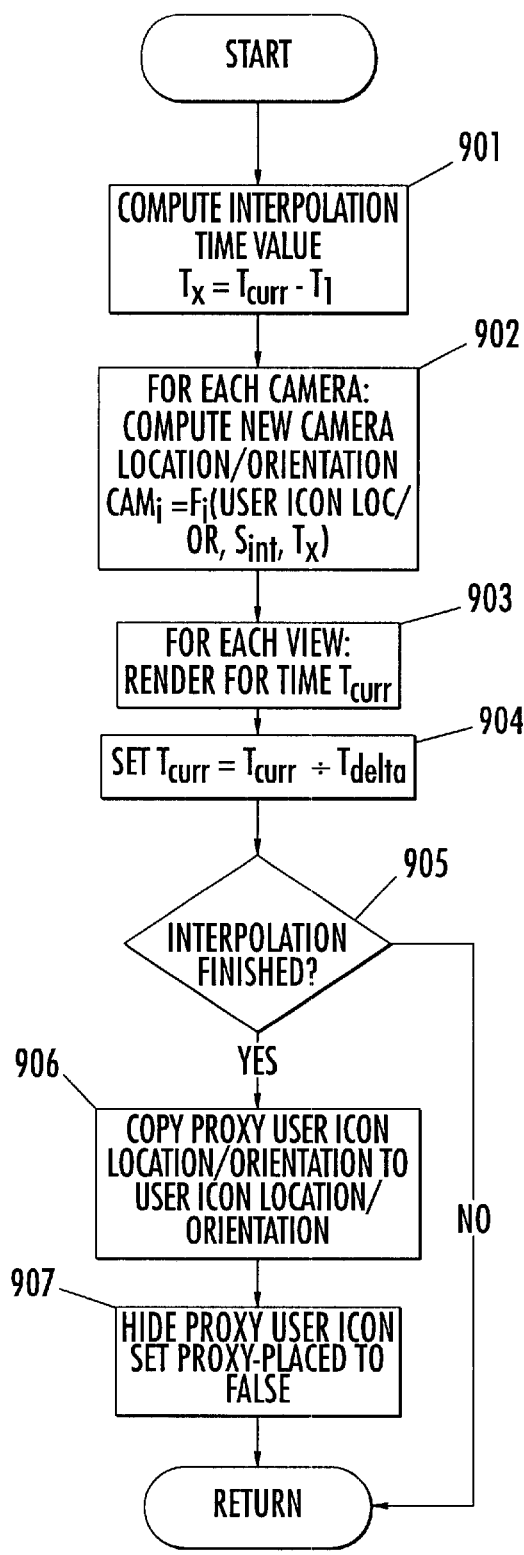
FIG. 9 shows the details of the update views subroutine of step 805 of FIG. 8.

Referring now to FIG. 9, which shows the details of the update views subroutine of step 805 of FIG. 8, at step 901, an interpolation elapsed time value $T_x$ is computed. As defined above, $T_x$ is the elapsed time since the start of the interpolation, or $T_{curr}-T_1$. If an interpolation sequence is not in progress, $T_{curr}=T_1$ and $T_x$ is 0. Next, at step 902, a new location and orientation is computed for each view camera by the interpolation function currently assigned to the view. The position of a respective camera ($cam_i=F_i(S_{int})$) is computed using the interpolation function assigned to the camera.

As set forth above, and shown at step 902, the interpolation state $S_{int}$ is one of the inputs to the mathematical or procedural computation $F_i$, based on the user icon's location/orientation, state information, current time, and other system state and input values, which are encapsulated in $S_{int}$. The function may also modify $S_{int}$. In particular, the interpolation function may determine that the interpolation is complete and clear the INTERPOLATING flag.

Once the cameras have been placed and oriented, the update views routine transitions to step 903, wherein each view is rendered from its camera's point of view. Next, in step 904, the current time $T_{curr}$ is incremented by a delta amount $T_{delta}$. The delta amount may be derived by sampling a real-time or system clock, or may be artificially generated in the case of a non-real-time simulation. Typically it is the refresh rate of the display, e.g., $1/30^{th}$ of a second (for a fixed frame rate system), or the time required to render the previous frame (for a variable frame rate system).

Next, in query step 905, the routine determines whether a MOVE-TO interpolation in progress has been completed (which may be indicated by clearing the INTERPOLATING flag). If the answer to step 905 is NO, the routine is finished and exits to step 806 of FIG. 8. If the answer to step 905 is YES, the routine transitions to step 906, wherein the location/orientation of the user icon is updated by copying the proxy user icon location/orientation. Once the user icon is co-located with the proxy user icon, the proxy user icon is render invisible in step 907. Also, a PROXY-PLACED flag is set to FALSE. The update views routine is now finished and exits to step 806 of FIG. 8.

Figure 10:
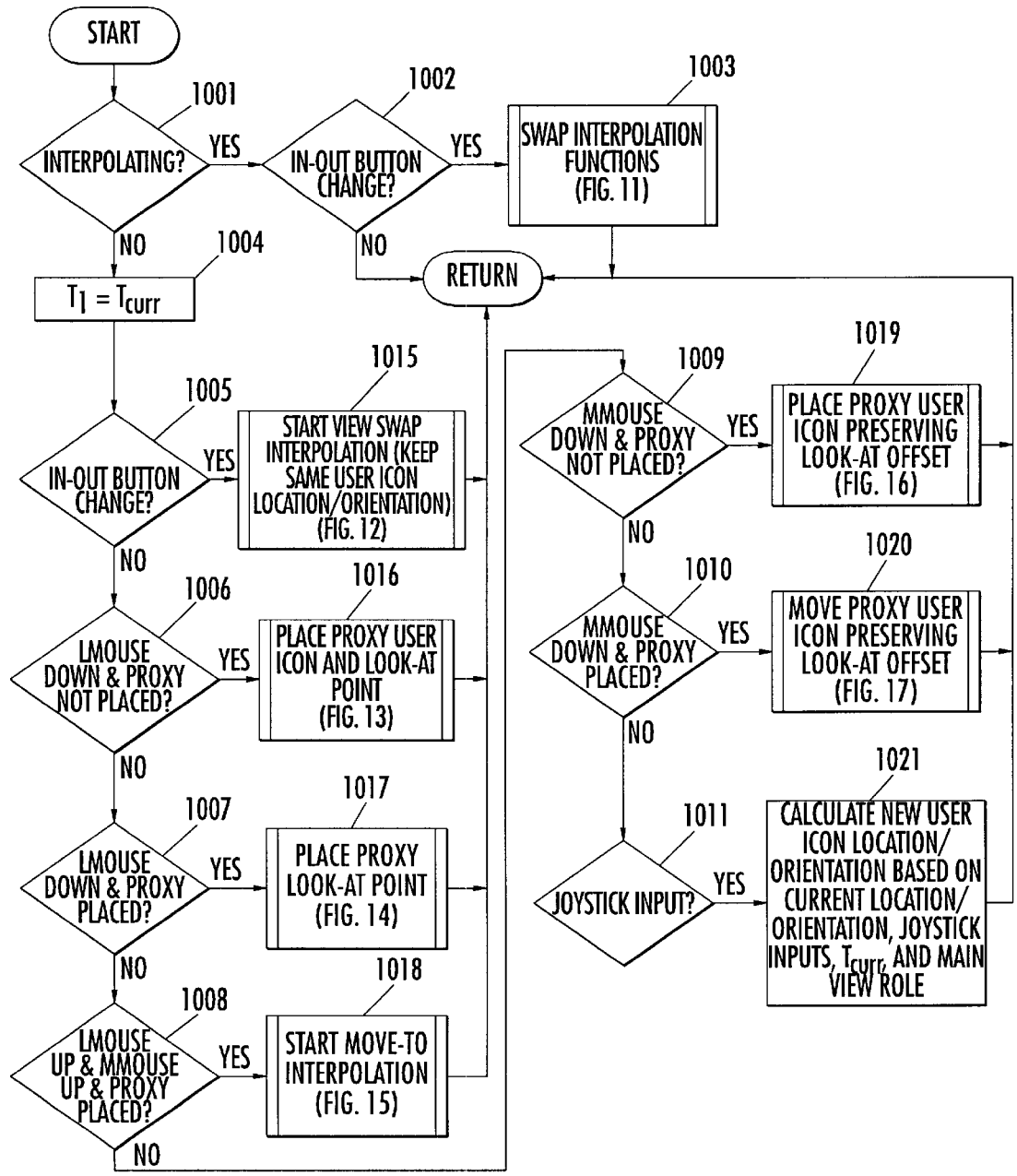
FIG. 10 shows the details of the handle input subroutine of step 807 of FIG. 8.
Figure 11:
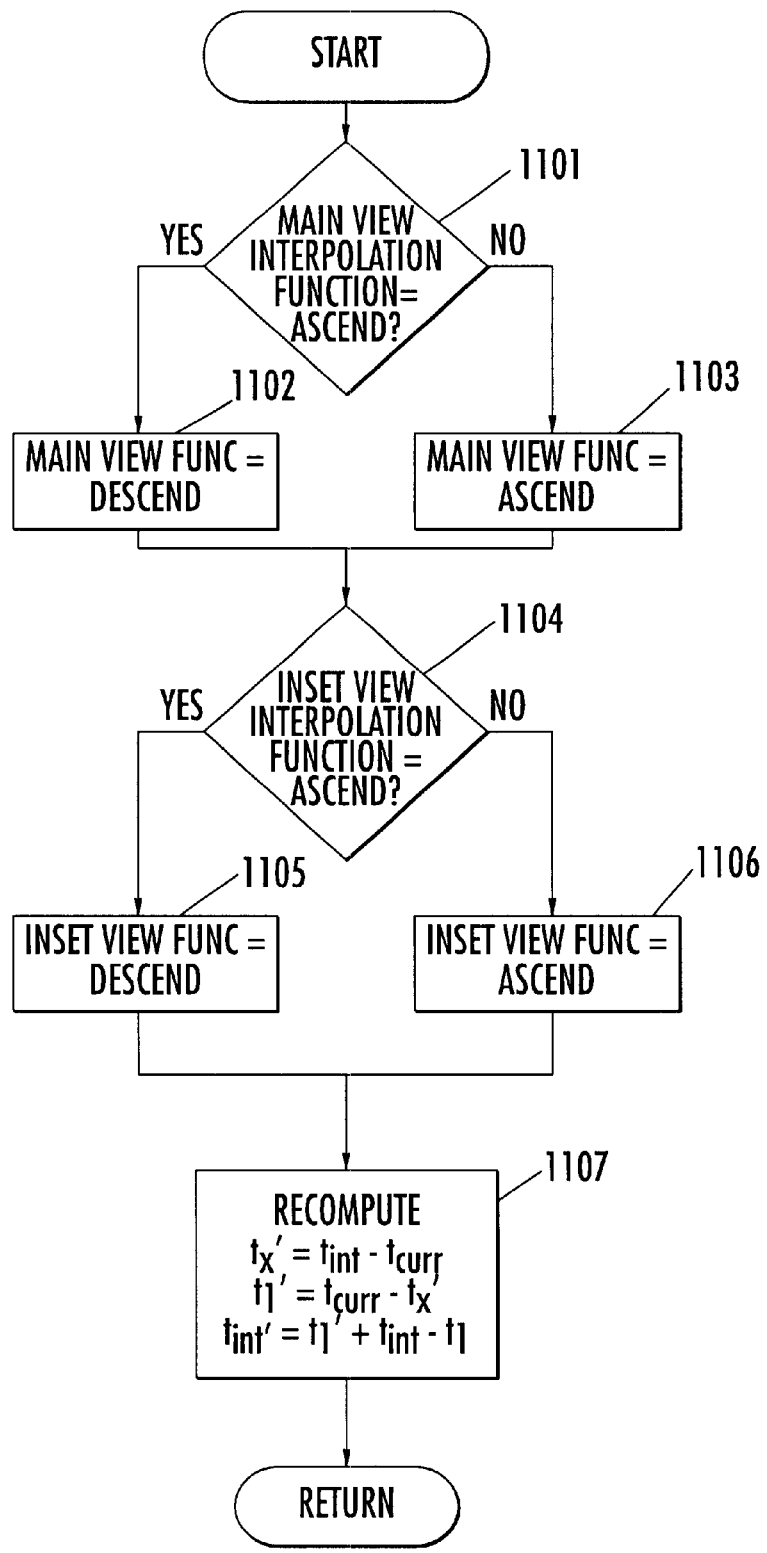
FIG. 11 shows the details of the swap interpolation subroutine of step 1003 of FIG. 10.

Referring now to FIG. 10, which shows the details of the handle input subroutine of step 807 of FIG. 8, at query step 1001, a determination is made as to whether there is currently an interpolation in progress. If the answer to query step 1001 is YES, an in-out button of the set of pushbuttons 35 is checked in query step 1002. If there is a change in state of the in-out button (the answer to query step 1002 is YES), the routine transitions to step 1003 (the details of which are shown in FIG. 11, to be described), wherein the main and inset interpolation functions are swapped. If there is no change in state of the in-out button (the answer to query step 1002 is NO), the routine is returned to the update views subroutine of FIG. 9.

Figure 12:
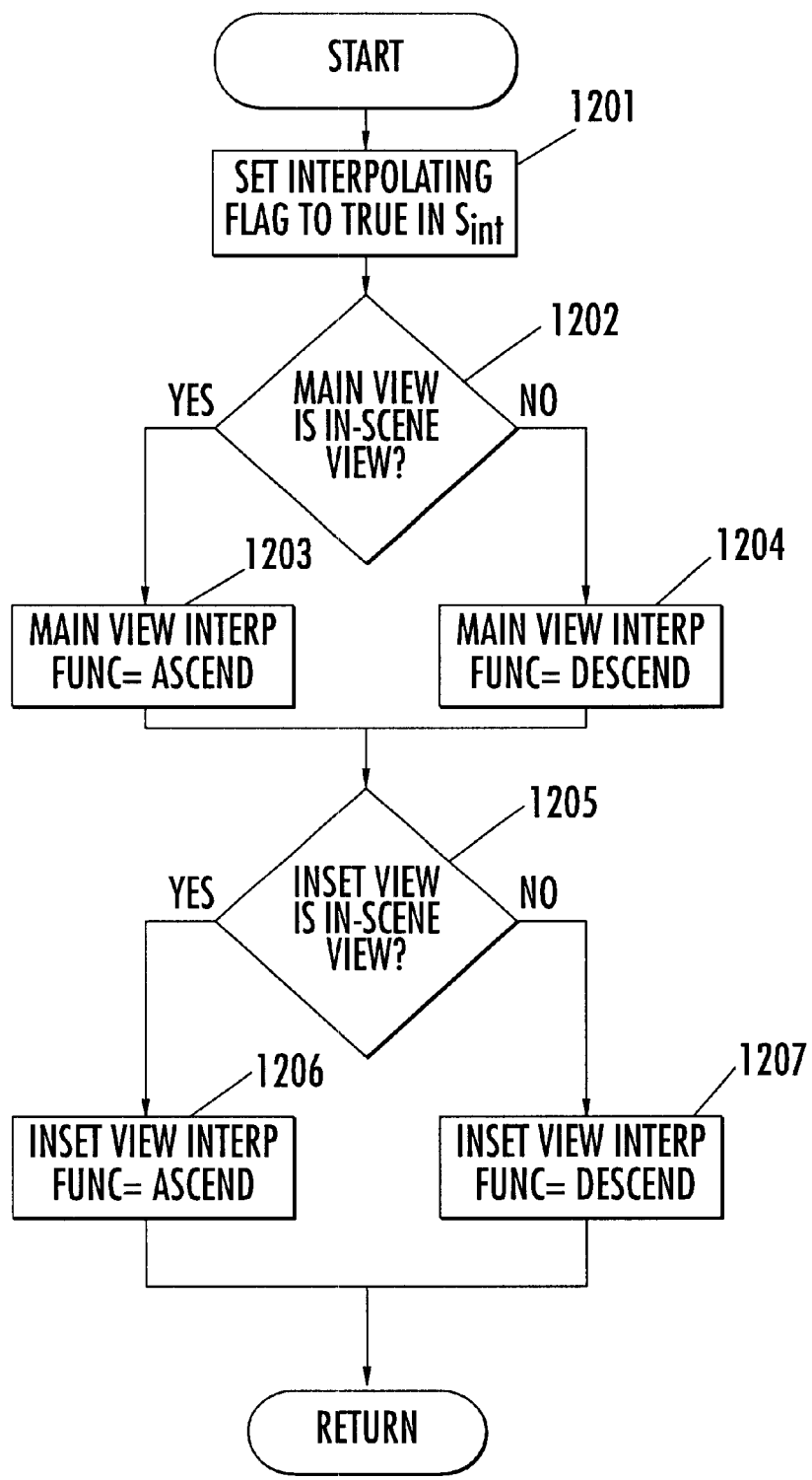
FIG. 12 shows the details of the start view swap interpolation step 1015 of FIG. 10.

If there is no interpolation in progress (the answer to query step 1001 is NO), the routine transitions to step 1004, wherein the interpolation start time $T_1$ is set at the current time $T_{curr}$. Next, in a sequence of query steps 1005–1011, various input device values are polled. In query step 1005, the state of the in-out button state is checked. If the in-out button changes (the answer to query step 1005 is YES), a view swap interpolation is conducted in step 1015 (the details of which are shown in FIG. 12, to be described). In this step, the user icon location and orientation determine the endpoints of the interpolation. The user icon is not modified: only the cameras move in this interpolation.

Figure 13:
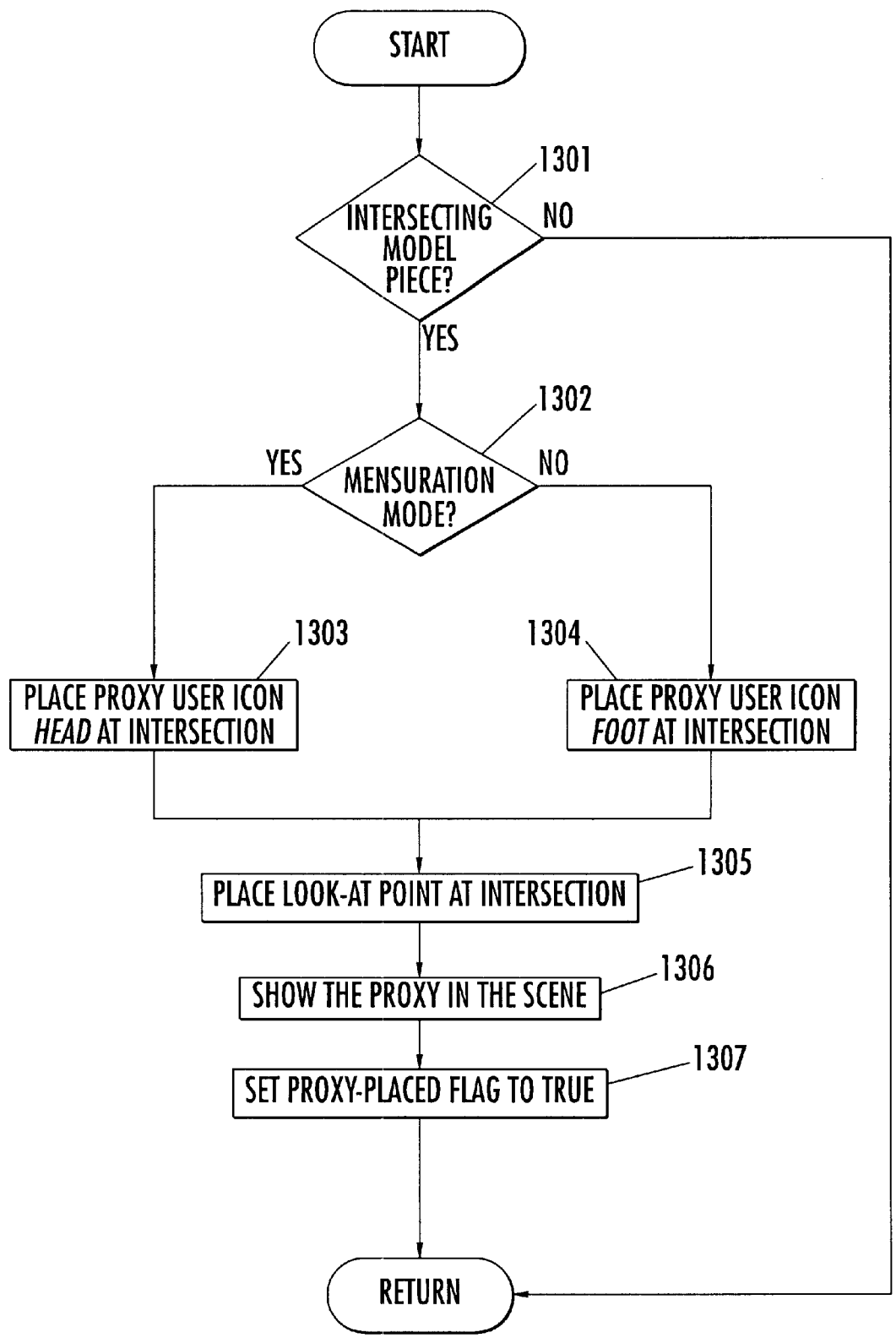
FIG. 13 shows the details of the subroutine for the place proxy user icon and look-at point start step 1016 of FIG. 10.

If the answer to query step 1005 is NO, the state of the left mouse button and the placement of the proxy user icon are checked in query step 1006. If the left mouse button is down, but the proxy user icon has not yet been placed in the image, the PROXY_PLACED flag is set to false (the answer to query step 1006 is YES), the proxy user icon and look-at point are placed in step 1016 (the details of which are shown in FIG. 13, to be described).

Figure 14:
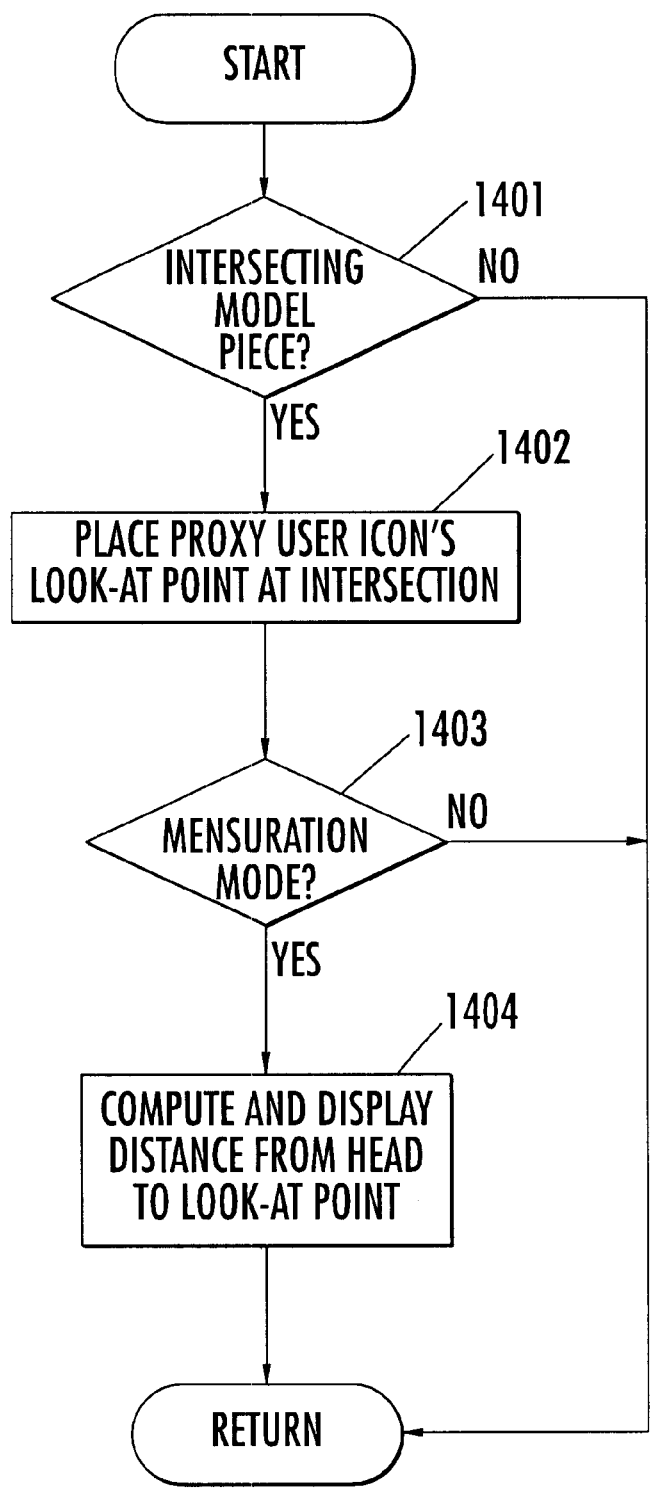
FIG. 14 shows the details of the subroutine for the place proxy look-at point step 1017 of FIG. 10.

If the answer to query step 1006 is NO, the state of the left mouse button and the placement of the proxy user icon are checked in query step 1007. If the left mouse is down and the proxy user icon has been placed (the answer to query step 1007 is YES), the mouse input is used to adjust the proxy user icon look-at point in step 1017 (the details of which are shown in FIG. 14, to be described).

Figure 15:
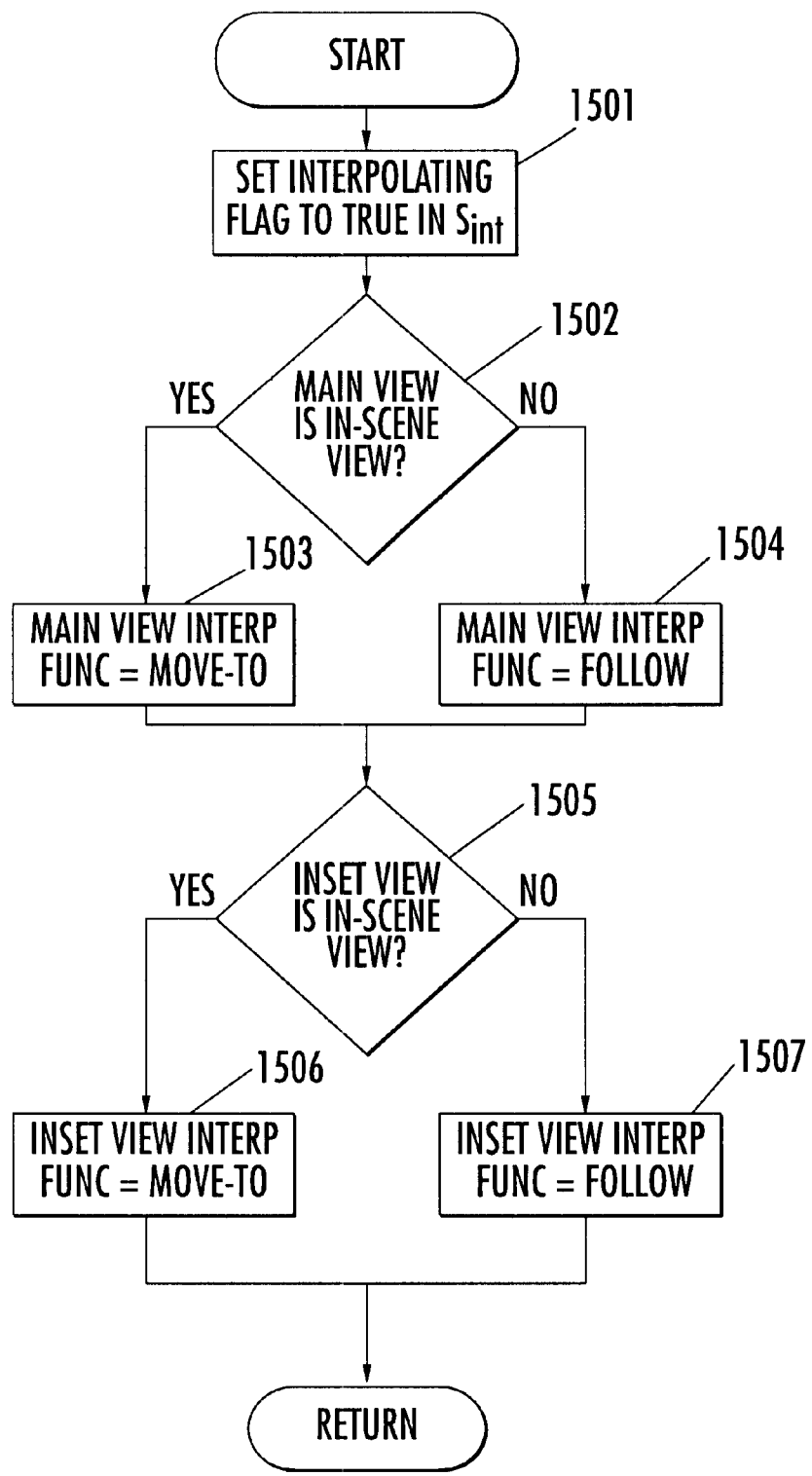
FIG. 15 shows the details of the subroutine for the start move-to interpolation step 1018 of FIG. 10.

If the answer to query step 1007 is NO, the states of the left and middle mouse buttons and the placement of the proxy user icon are checked in query step 1008. If the left mouse button is up, the middle mouse button is up and the proxy user icon has been placed (the answer to query step 1007 is YES), a move-to interpolation sequence is carried out in step 1018 (the details of which are shown in FIG. 15, to be described).

Figure 16:
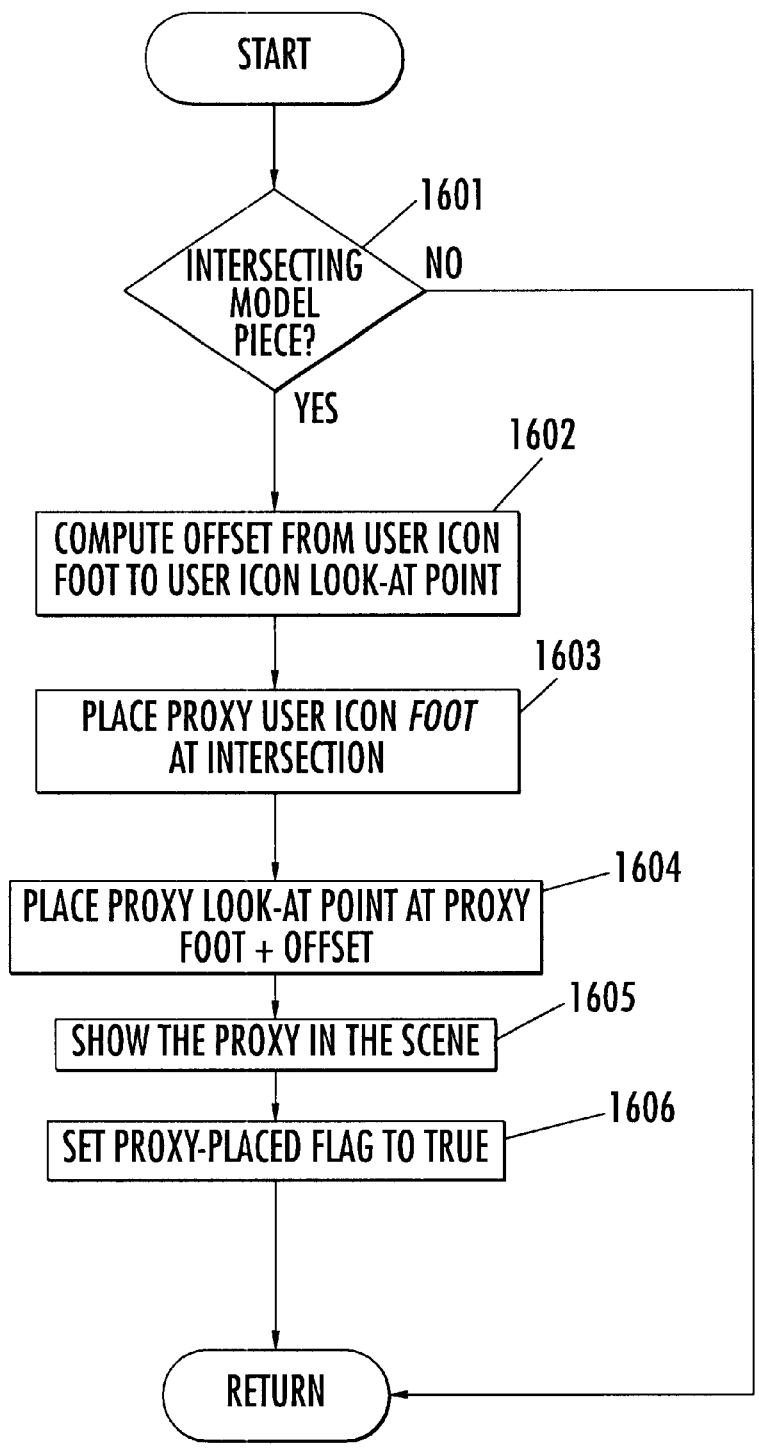
FIG. 16 shows the details of the subroutine for the place proxy user icon preserving look-at offset step 1019 of FIG. 10.

However, if the answer to query step 1008 is NO, the state of the middle mouse and placement of the proxy user icon are checked in query step 1009. If the middle mouse button is down and the proxy user icon is not placed (the answer to query step 1009 is YES), the routine transitions to step 1019 (the details of which are shown in FIG. 16, to be described), wherein the proxy user icon is placed and the proxy user icon look-at point is relocated to retain the same orientation as the user icon.

Figure 17:
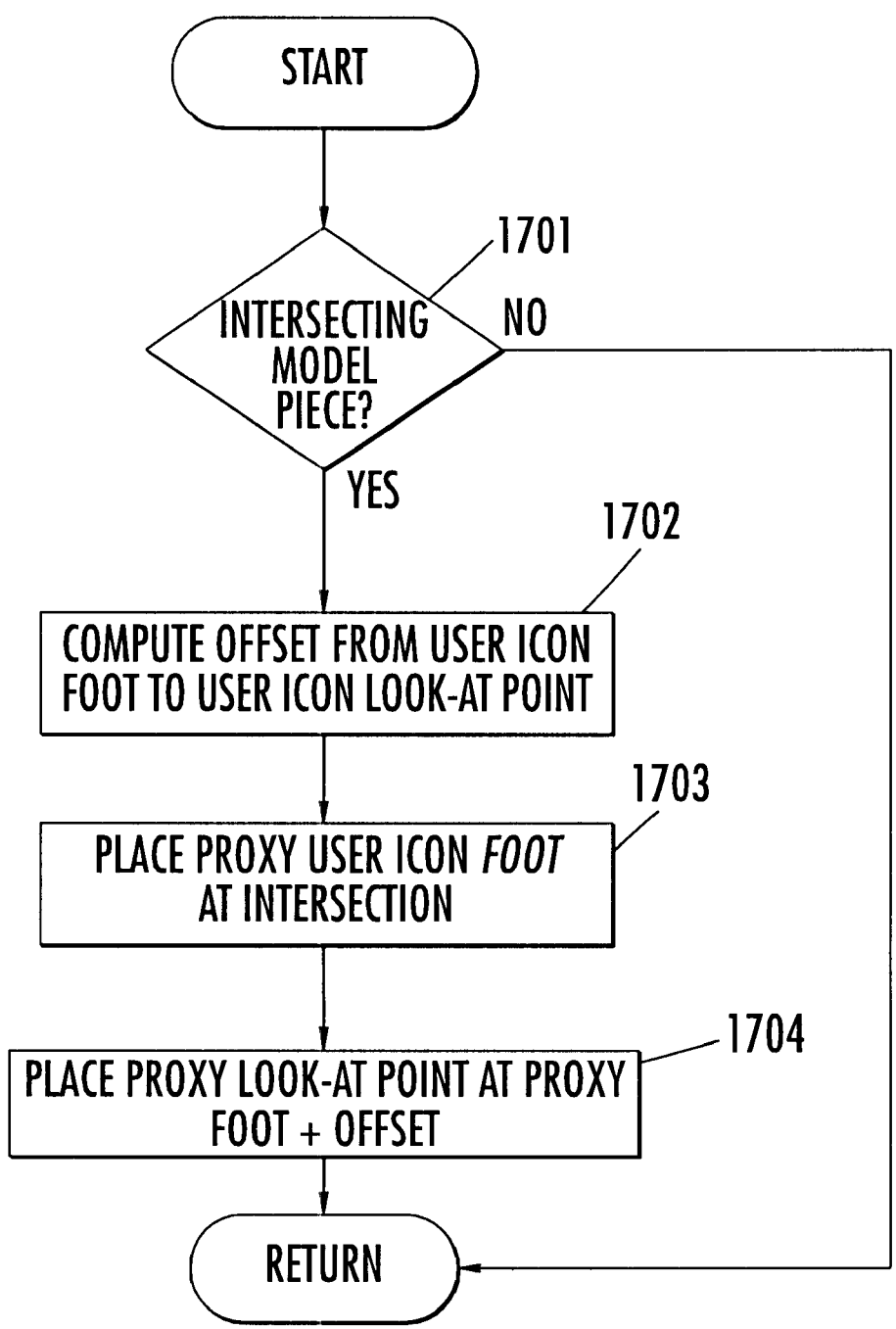
FIG. 17 shows the details of the subroutine for the move proxy user icon preserving look-at offset step 1020 of FIG. 10.

If the answer to query step 1009 is NO, the state of the middle mouse and placement of the proxy user icon are checked in query step 1010. If the middle mouse button is down and the proxy user icon has been placed in the image (the answer to query step 1010 is YES), the routine transitions to step 1020, (the details of which are shown in FIG. 17, to be described), wherein the proxy user icon is moved to a new location based on the mouse input, and the proxy user icon look-at point is relocated to retain the same orientation as the user icon.

If the answer to query step 1010 is NO, the joystick is checked for input in query step 1011. If there is any joystick input (the answer to query step 1011 is YES), the joystick input is used in step 1021 to compute a new location/orientation for the user icon. In this step, a mathematical or procedural computation is executed using the input values and the interpolation state $S_{int}$ values to derive the new user icon parameters. This is sometimes referred to as a navigation model or a motion model.

FIG. 11 shows the steps of the swap interpolation subroutine of step 1003 of FIG. 10, in particular, the manner in which the interpolation functions are swapped when the in-out button changes state, during the course of an already in progress view swap operation. The flow sequence of FIG. 11 is entered only when interpolation is currently in progress, and causes the currently running view swapping operation to be reversed.

When the views are swapped, the locations of the main viewport camera and the inset viewport camera are moved smoothly to new locations. As a non-limiting example, two cameras may start at opposite ends of and move therefrom along the same path. However, an alternative camera motion scheme may be employed, such as having one motion when a camera is ascending, and a second motion when a camera is descending.

Figure 11A:
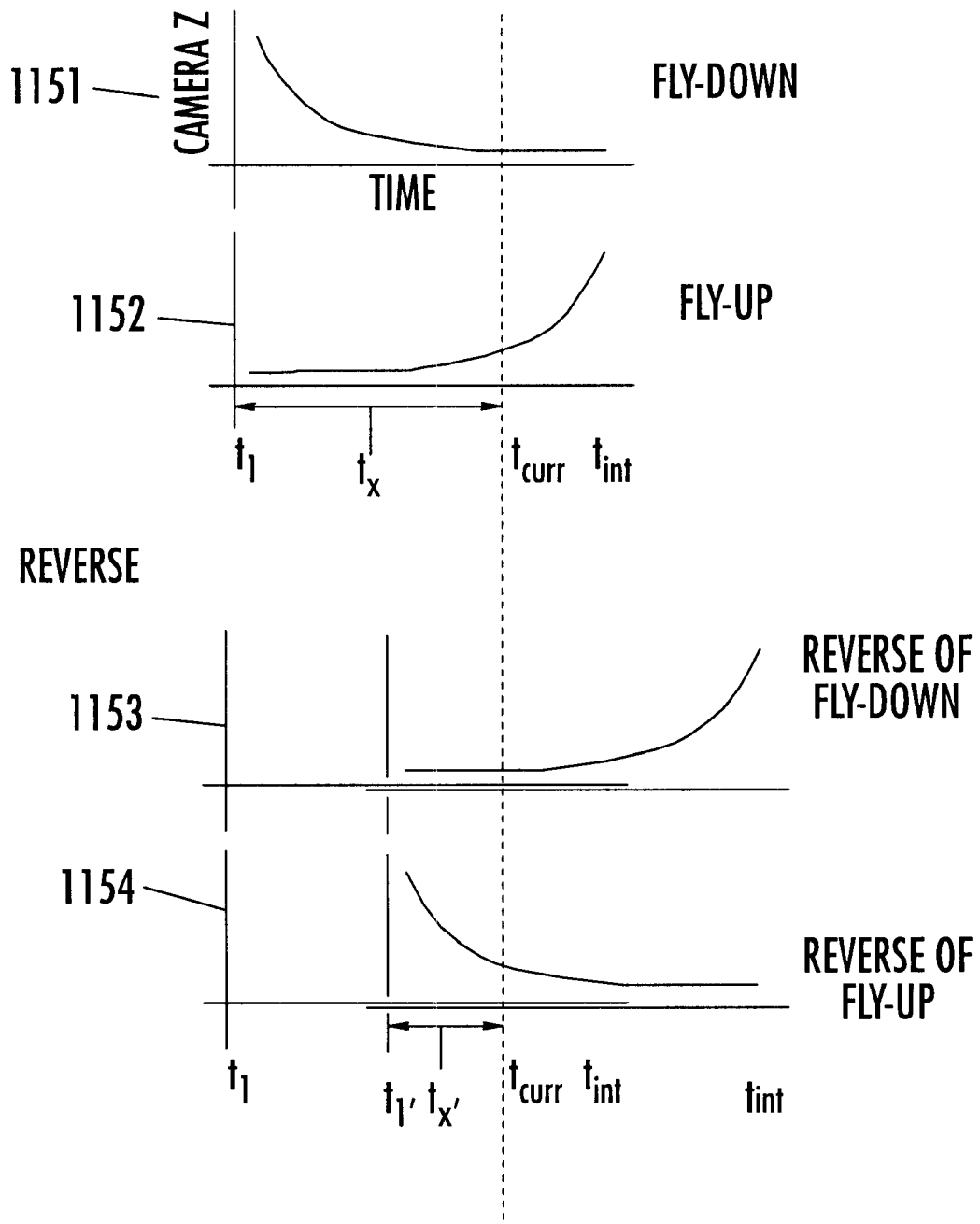
FIG. 11A shows time variations of the height of a camera above a viewed scene, for 'fly-down' and 'fly-up' transitions, and reversals thereof during an in-progress image swapping operation.

FIG. 11A graphically illustrates a non-limiting example of an interpolation function that may be used to modify the overview camera's altitude, or Z coordinate, as it moves into the scene. In FIG. 11A, a time variation 1151 shows the change in the 'height' of the viewing camera (along an elevation or Z axis) above the viewed scene for a descend or 'fly-down' transition. The camera starts moving at time $t_1$, and its altitude decreases rapidly. As the camera gets lower, its rate of change of descent decreases. The camera eventually reaches its destination at time $t_{int}$. Similarly, the camera's x,y and orientation parameters (heading, pitch and roll) may be interpolated by respective functions that together produce the desired motion. In a complementary fashion, time variation 1152 shows an ascend or 'fly-up' operation. Also shown in FIG. 11A are time variations 1153 and 1154 (beginning at time $t_1$') of the height of the viewing camera, in response to a reversal of respective descend and ascend image swapping transitions 1151 and 1152.

When a reversal occurs during a view swap operation, new functions are applied to the camera location and orientation parameters, to return the cameras to their original locations. In the non-limiting example shown in FIG. 11A, the cameras are caused to simply reverse their motion. For this purpose, a set of interpolation functions are defined or reflected with respect to the current time parameter $t_{curr}$.

The values $t_1$, $t_{int}$ and $t_x$ may be recomputed as follows:

$t_x' = t_{int} - t_{curr}$ (this is the time remaining from the original interpolation);

$t_1' = t_{curr} - t_x'$ (this is the new interpolation function's start time); and $t_{int}' = t_1' + (t_{int} - t_1)$ (this is the new function interpolation end time).

This reversal mechanism is given as a non-limiting example; other methods of reversal may be employed, such as decreasing $t_x$ back towards $t_1$, or by starting a new interpolation with a completely new function defined over a range starting at $t_{curr}$.

Referring again to the flow sequence of FIG. 11, at query step 1101, a determination is made as to whether the main view camera is currently in the ASCEND mode (ascending out of the scene). If the answer to query step 1101 is YES, its interpolation function is switched to DESCEND mode in step 1102. If it is currently descending (the answer to query step 1101 is NO), its interpolation function is switched to ASCEND mode in step 1103. From either of steps 1102 and 1103, the swap interpolation functions routine transitions to query step 1104, wherein the inset view interpolation view is checked. If the inset view camera is currently ascending (the answer to query step 1104 is YES), its interpolation function is switched to DESCEND mode in step 1105. If the inset view camera is currently descending (the answer to query step 1104 is NO), its interpolation function is switched to ASCEND in step 1106.

After the interpolation functions are swapped, as described above, the start time of the interpolation is adjusted or recomputed in step 1107, so that the current interpolation point $f(T_x)$ remains constant. The resulting and desired effect is that the views provided by the overview and inset cameras appear to reverse directions. The swap interpolation functions subroutine is now finished and is returned to the update views subroutine of FIG. 9.

FIG. 12 shows the details of the start view swap interpolation step 1015 of FIG. 10. As described briefly above, this subroutine is executed when two conditions are fulfilled: 1—an interpolation is not already in progress; and 2—the state of the view swap button changes. In step 1201, to indicate that an interpolation sequence is in progress, the INTERPOLATING flag is set to TRUE in $S_{int}$. Next, in query step 1202, a determination is made whether the main view is currently showing the in-scene viewpoint. If so (the answer to query step 1202 is YES), the subroutine transitions to step 1203, wherein the main view interpolation function is set to ASCEND. On the other hand, if the main view is currently showing the overhead map view (the answer to step 1202 is NO), the main view interpolation function is set to DESCEND in step 1204.

From either of steps 1203 and 1204, the subroutine transitions to query step 1205, to determine whether the inset view is currently showing the in-scene viewpoint. If so (the answer to query step 1205 is YES), the subroutine transitions to step 1206, wherein the inset view interpolation function is set to ASCEND. On the other hand, if the inset view is currently showing the overhead map view (the answer to step 1205 is NO), the main view interpolation function is set to DESCEND in step 1208. From either of steps 1206 and 1207, the subroutine of FIG. 12 is returned to the update views routine of FIG. 9.

FIG. 13 shows the details of the subroutine for the place proxy user icon and look-at point start step 1016 of FIG. 10, used for initial placement of the proxy user icon for a place-and-orient operation. Both a point on the body of the proxy icon (either the head or the foot) and the proxy user icon look-at point are placed at the same location. Customarily, the user will want to relocate the look-at point to a new location.

At query step 1301, it is initially determined whether the ray defined by the current camera location and the current mouse pointer position within the viewport intersects the 3D scene geometry. If the answer to query step 1301 is YES, that intersection point will be used for placement, and the routine transitions to mensuration mode query step 1302. If the answer to query step 1301 is NO, the subroutine returns to the update views subroutine of FIG. 9.

Query step 1302 determines whether the process is in mensuration mode. If the answer to query step 1302 is YES, the routine transitions to step 1303, wherein the head of the proxy user icon is placed at the intersection point to define a first endpoint of the measurement. If the answer to query step 1302 is NO, the routine transitions to step 1304, wherein the foot of the proxy user icon is placed at the intersection point. From either of steps 1303 and 1304, the routine transitions to step 1305, wherein the proxy user icon look-at point is initially placed at the point of intersection, although it will most likely be moved by the user in subsequent interaction. In step 1306, the proxy user icon is made visible in the scene, and then a PROXY-PLACED flag indicating that placement has occurred is set to TRUE, in step 1307. The subroutine of FIG. 12 then returns to the update views routine of FIG. 9.

FIG. 14 shows the details of the subroutine for the place proxy look-at point step 1017 of FIG. 10, for placing the proxy user icon look-at point in the scene. In query step 1401, it is determined whether the ray defined by the current camera location and the current mouse pointer position within the viewport intersects the 3D scene geometry. If the answer to query step 1401 is YES, that intersection point is used for placement, by setting the proxy user icon look-at point to the intersection point in step 1402. If not, the subroutine returns to the update views routine of FIG. 9.

Next, in query step 1403, it is determined whether the process is currently in mensuration mode. If the answer to query step 1403 is YES, the subroutine transitions to step 1404, wherein the 3D distance from the proxy user icon head to the look-at point is computed and displayed near the current mouse cursor location. If the answer to query step 1403 is NO, or upon completion of step 1404, the subroutine returns to the update views routine of FIG. 9.

FIG. 15 shows the details of the subroutine for the start move-to interpolation step 1018 of FIG. 10, for starting the user icon move interpolation. This subroutine is entered only when the user has used the mouse to interactively choose a new location and orientation for the user icon. In step 1501, the INTERPOLATING flag is set to TRUE in $S_{int}$, to indicate that an interpolation sequence is in progress. This causes most user inputs to be temporarily ignored.

Next, in query step 1502, a determination is made whether the main view is currently the in-scene view. If the answer to query step 1502 is YES, the main view interpolation function is set to MOVE-TO in step 1503. If it is currently the overview view (the answer to query step 1502 is NO), the main view interpolation function is set to FOLLOW (where it should already be) in step 1504.

From either of steps 1503 and 1504, the subroutine transitions to query step 1505, to determine whether the inset view is currently the in-scene view. If the answer to query step is YES, the inset view interpolation function is set to MOVE-TO in step 1506. If it is currently the overview view (the answer to query step 1502 is NO), the inset view interpolation function is set to FOLLOW (where it should already be) in step 1507. The subroutine then returns to the update views routine of FIG. 9.

FIG. 16 shows the details of the subroutine for the place proxy user icon preserving look-at offset step 1019 of FIG. 10, which is employed for a place-but-don't-reorient operation. The look-at point maintains a fixed offset from the proxy user icon, so that the orientation does not change even when the location changes. In query step 1601, it is initially determined whether the ray defined by the current camera location and the current mouse pointer position within the viewport intersects the 3D scene geometry. If the answer to query step 1601 is NO, the subroutine returns to the update views subroutine of FIG. 9.

However, if the answer to query step 1601 is YES, that intersection point will be used for placement, and the routine transitions to step 1602, wherein an offset vector (a 3D vector) is computed by subtracting the user icon foot location from the user icon look-at point location. Next, in step 1603, the proxy user icon foot is set to the intersection point. In step 1604, the offset vector is used to place the look-at point relative to the foot. This is effected by adding the offset vector to the foot location to get the location of the proxy user icon look-at point. In step 1605, the proxy user icon is made visible, and in step 1606, The PROXY-PLACED flag is set to TRUE. The subroutine then returns to the update views routine of FIG. 9. (As a further alternative feature, the place proxy user icon preserving look-at offset routine of the flow chart of FIG. 16 may be modified to preserve the orientation, once the proxy icon has been initially placed, until a prescribed minimum adjustment is performed to the look-at point.)

FIG. 17 shows the details of the subroutine for the move proxy user icon preserving look-at offset step 1020 of FIG. 10, which is employed for moving the proxy user icon, while maintaining its orientation. In query step 1701, it is initially determined whether the ray defined by the current camera location and the current mouse pointer position within the viewport intersects the 3D scene geometry. If the answer to query step 1701 is NO, the subroutine returns to the update views subroutine of FIG. 9. If the answer to query step 1701 is YES, however, that intersection point will be used for placement, and the routine transitions to step 1702, wherein an offset vector (a 3D vector) is computed, by subtracting the user icon foot location from the user icon look-at point location. Next, in step 1703, the proxy user icon foot is placed at the intersection point. In step 1704, the offset vector is used to place the look-at point relative to the foot. This is carried out by adding the offset vector to the foot location to get the location of the proxy user icon look-at point. The subroutine then returns to the update views routine of FIG. 9.

Figure 18:
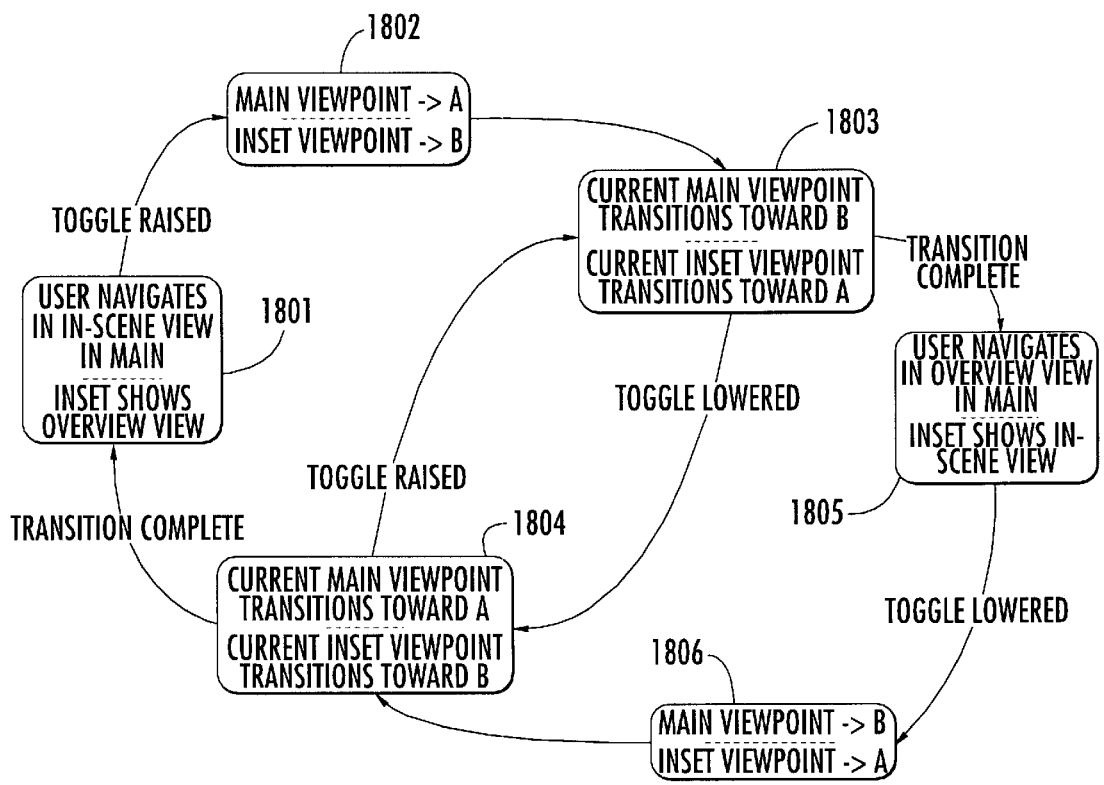
FIG. 18 is a state diagram associated with the view-swapping functionality of the present invention.

The operation of the view-swapping functionality of the present invention will now be described with reference to the state diagram of FIG. 18, and the toggle position, in-scene/overview diagrams of FIGS. 19 and 20. As pointed out previously, the roles and viewpoints of the main viewport and the inset viewport may be readily swapped by the operation of a toggle switch on an input device. Since the two views are mutually synchronized, the user's viewing 'cameras' move in a coordinated fashion to swap locations, and the two viewports swap display roles.

Figure 19:
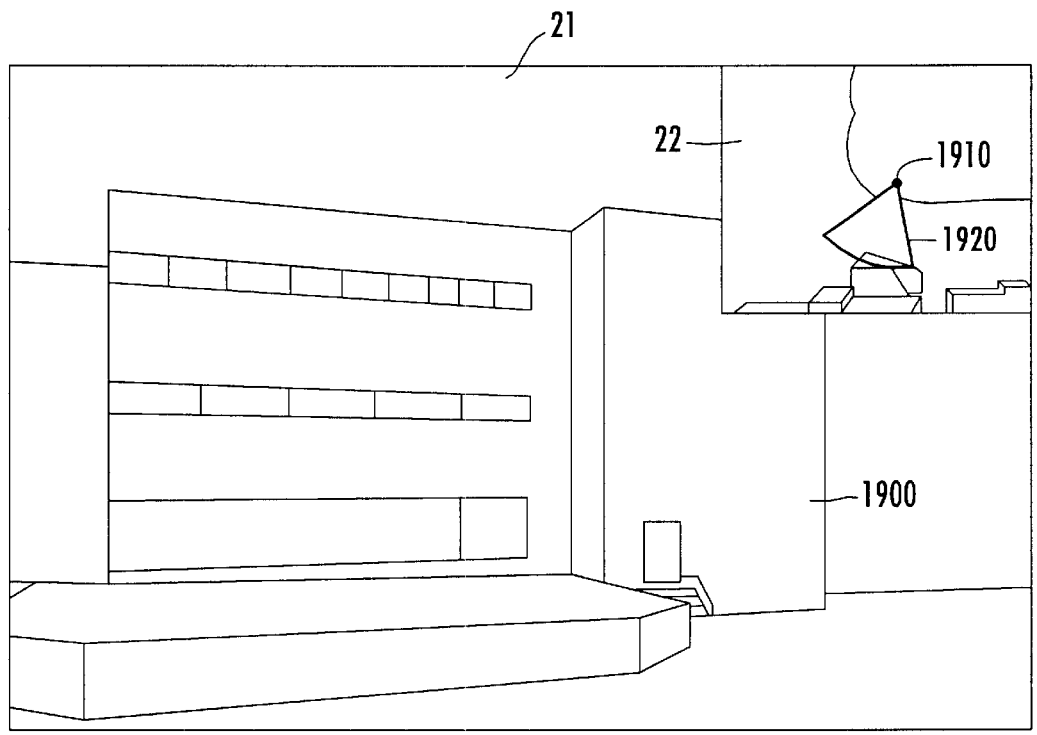
FIG. 19 shows a dual view display, in which the larger main viewport is displaying the in-scene view, while the inset viewport is displaying the overview view.
Figure 20:
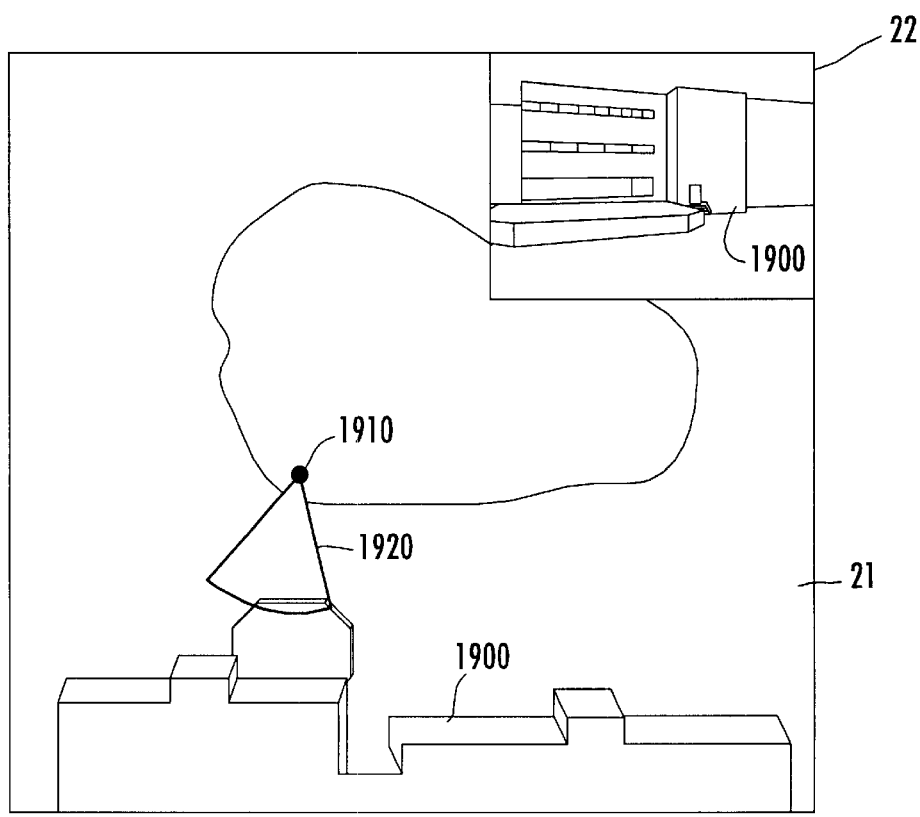
FIG. 20 shows a toggling/swapping of the dual view display of FIG. 19, in which the larger main viewport is displaying the overview view, while the inset viewport is displaying the in-scene view.

Consider for example, the dual view display shown in FIG. 19, where the larger main viewport 21 is displaying the in-scene view of a building 1900, while the inset viewport 22 is displaying the overview (map/bird's eye) view taken from the front of the building. Also shown in the inset viewport 22 of FIG. 19 are a user icon 1910 and an associated field of view 1920, to be described in detail below with reference to FIG. 28. This view mode corresponds to state 1801 of FIG. 18, and is typically employed for viewing ground level objects within an urban virtual world. In this state, the user is readily able to navigate through (change the user's location, orientation in) the in-scene view, by using the joystick or mouse to turn, move in any horizontal direction, and rise or descend, as described previously. The complement of this view mode corresponds to state 1805 of FIG. 18, in which the user may navigate through the overview view (using a different navigation model from that employed for navigating through the in-scene view).

For purposes of providing a non-limiting example, in the present description, the meaning of the toggle pushbutton is defined as follows: when the button is up (at 2001 in FIG. 20) the main viewport 21 transitions to the overview, and the inset viewport 22 transitions to the in-scene view; when the button is down (at 1901 in FIG. 19), the main viewport 21 transitions to the in-scene view, and the inset viewport 22 transitions to the overview view. Using this convention, when a user device toggle switch is raised, corresponding to the transition from state 1801 to state 1802 in the state diagram of FIG. 18, the transient image navigation subroutines of FIGS. 8–17, detailed above, are executed to reverse or swap the viewpoints of the overview and in-scene views (toward A and B in state 1802, or toward B and A, in state 1806).

As noted earlier, the present invention allows the user to change the state of the toggle at any time, even during the transition initiated by a previous toggle state change. When the user changes the toggle state during such a transition (e.g., pushes the toggle button down, as shown at state 1803, or releases the toggle button up, as shown at state 1804 in the state diagram of FIG. 18), the motion simply reverses and the viewpoints begin returning to their immediately previous locations.

Since the image swapping subroutines cause the toggled swap of the two views to be carried out simply and smoothly, the invention minimizes user distraction, and thereby facilitates maintaining the user's mental picture of his/her location in the virtual world. A principal benefit of this feature is that it allows a user at street level in an urban scene to readily and easily ascend or rise to a higher vantage point, in order to realize a better sense of the user's location within the scene.

This allows the user to ascend fully to the overview map viewpoint, or to rise up just far enough to realize where he/she is, and then immediately return to street level of the virtual 3D image. This feature also provides a convenient mix of close-up, on-the-street navigation with longer-range navigation. The user on-the-street can 'pop up' to the overview viewpoint, roam quickly to a distant part of the scene, and then descend back to street level in the new location. It additionally avoids the problem of having to provide appropriate scale factors to a single navigation model for both the close-up and long-range motions, and avoids the distraction of forcing the user to decide when to use one or the other. Since toggling between viewports exchanges one motion model for another, without bringing it to the user's attention, the user maintains his/her focus on the virtual world and not on the software tool.

Figure 21:
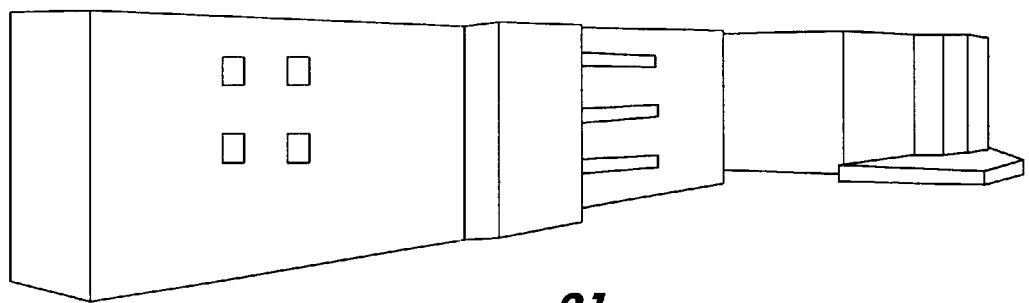
FIGS. 21–27 are pictorial in-scene diagrams for illustrating manipulation of an image for changes in viewpoints.
Figure 22:
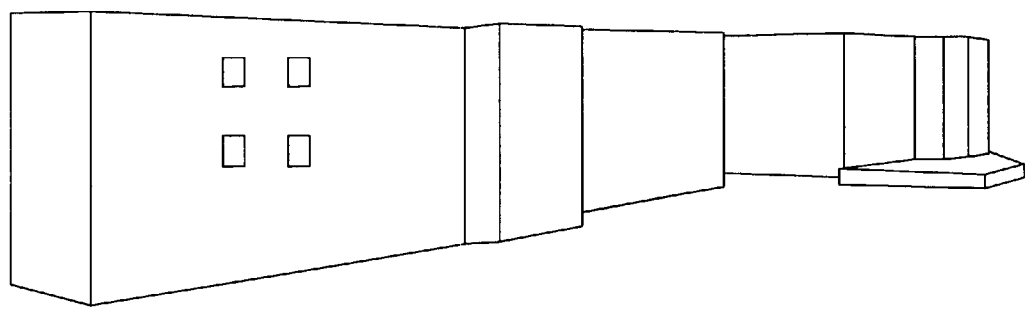

In addition to swapping views, the user may interactively navigate through a view, using either the joystick or mouse to manipulate the user's location and orientation within the main viewport scene. As detailed in the subroutines of FIGS. 8–17, described above, and as shown in the pictorial main viewport diagrams of FIGS. 21–27 and 30, in the course of using the mouse to select a new user location/orientation, from a current user location (corresponding to the in-scene view from the user vantage point of FIG. 21), the user first moves the mouse to the selected new vantage point (2201 in FIG. 22), and operates the left mouse button. This places the user icon foot at the new vantage point.

Figure 23:
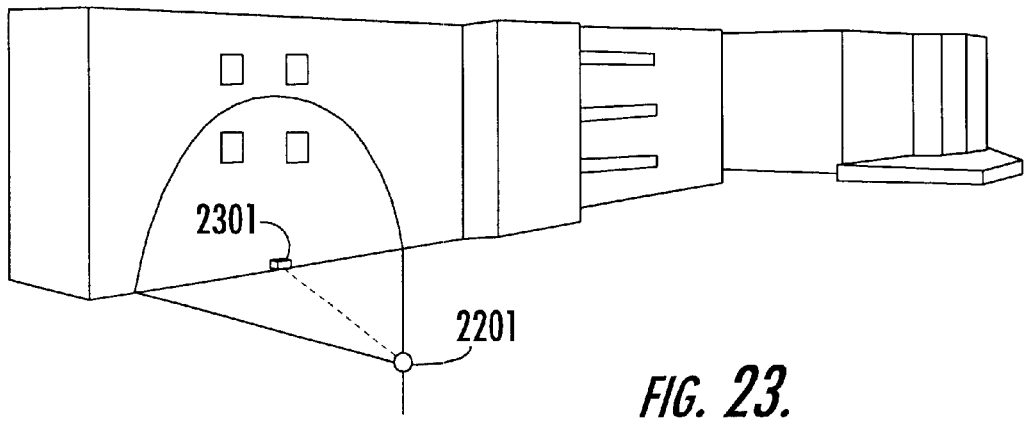
Figure 24:
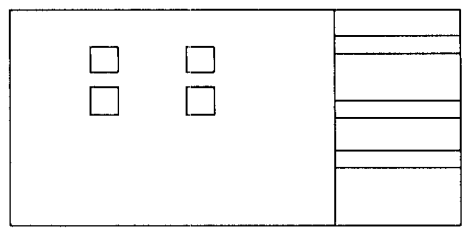
Figure 25:
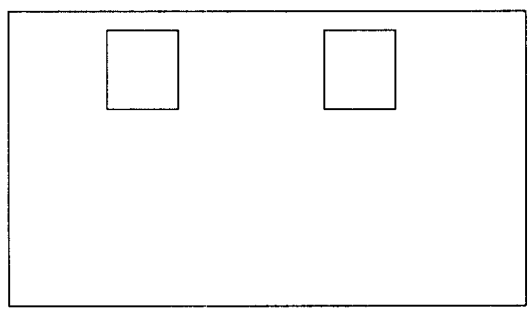

Next, as pictorially shown in FIG. 23, while holding down the left mouse button, the user moves the mouse to the desired look-at or target point (shown at point 2302 in FIG. 23), that will be viewed when the view of the scene is transitioned from the user's current location or vantage point (as viewed in FIG. 21) to the new vantage point 2302. The new look-at point 2302 will be used to orient the user when standing at the new vantage point 2201. As shown by the (reduced complexity—two step) view sequence of FIGS. 24 and 25, the image being displayed to the user then transitions (using interpolation based smoothing) from the scene image as currently being viewed in FIG. 21 to that portion of the scene containing the new look-at point (2302 in FIG. 23) as it will be viewed from the user's new location or vantage point 2201.

Advantages of this user icon transition mechanism include the fact that only a single press/drag/release mouse operation is required to position the user icon at a predetermined location (e.g., height above a point on a surface) within the 3D scene, orient the user icon, set the viewing direction, and set the look-at point to another point on a target surface within the scene. The user's viewpoint does not change in the window until the operation is complete. This allows the other view to present a preview of the user's new viewpoint. Moreover, as will be described, this same interaction and visual representation can be employed for mensuration.

Figure 26:
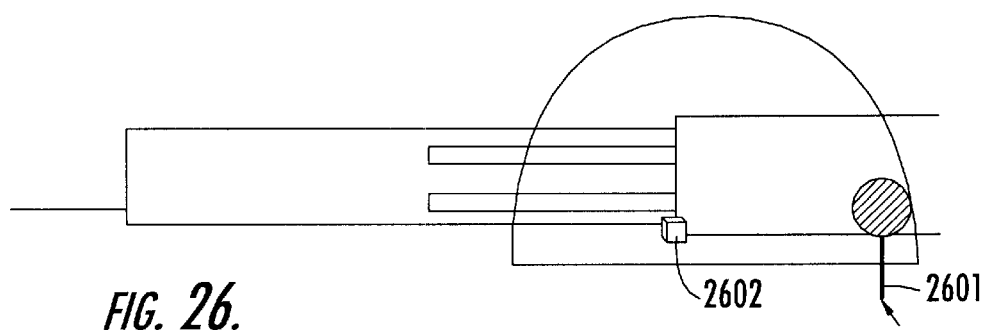
Figure 27:
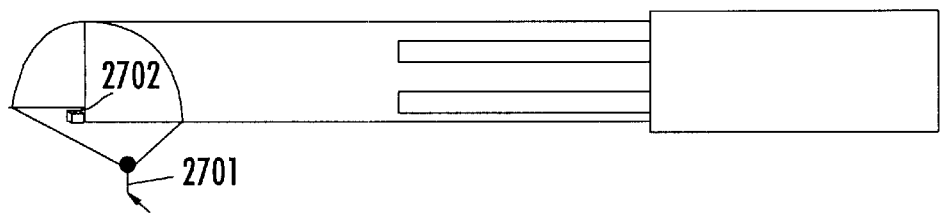

FIGS. 26 and 27 show the interactive placement of the user icon, allowing the user to change location but not relative viewpoint orientation through the operation of the middle mouse button. FIG. 26 shows placement of the user icon at a vantage location 2601 by pressing the middle mouse button. The relative target or look-at location is shown at 2602. There is no control over the icon's relative viewpoint orientation. FIG. 27 shows another placement of the vantage point to location 2701. The new look-at location 2702 relative to the new vantage point 2701 in the image of FIG. 27 remains relatively the same as the look-at location 2602 is to the vantage point 2601 in FIG. 26.

Figure 28:
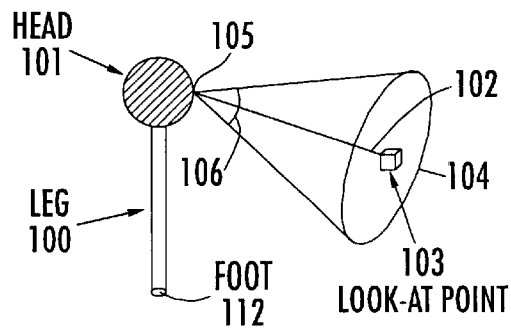
FIG. 28 shows a virtual user icon.

FIG. 28 shows the configuration of a reduced complexity user icon 100 having a visual representation that conveys several pieces of information to the user. A first is the location of the user's head, or viewpoint 101 in the virtual world. In a non-limiting but preferred implementation, the user icon's head 101 may be represented by a colored (e.g., red) sphere. Second, the heading or line-of-sight 102 of the user 100 corresponds to the 'forward' direction faced by the user toward a look-at point 103 in his/her local frame of reference. The look-at point 103 may be represented by a colored (e.g., yellow) cube whose center is placed at the looked-at point in the 3D scene. The look-at point 103 also determines the center of the base of a semi-transparent colored (e.g., blue) cone 104. Heading (view direction, or the azimuth and elevation of the view) may be indicated in the displayed image by the axis 102 of the cone 104. The cone 104 has an apex 105 that touches the center of the red sphere 101, and 'boresight' axis 102 lies along a ray from the center of the sphere 101 through the point of intersection of the cone apex with the sphere's surface.

Figure 29:
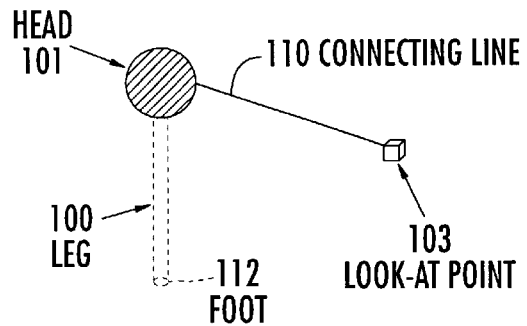
FIG. 29 shows a mensuration icon.

The user's field of view corresponds to the angle 106 subtended by the cone 104. Because a cone is used, the field of view indication only approximates what is seen in the displayed rectangular viewport. To provide a more accurate representation a frustum whose rectangular cross section matches the aspect ratio of the viewport may be used instead of the cone. In mensuration mode, to be described, the cone 104 of FIG. 28 is not displayed. Instead, as shown in FIG. 29, a line or very narrow cylinder 110 is used to connect the user icon head 101 and the look-at point 103.

The distance to the point being viewed (look-at point 103) corresponds to the height of the cone 104 (the distance along the line-of-sight axis 102 from the center of the sphere 101 to the base of the cone. The tallness of the user may be represented by a thin cylinder or leg 100, whose axis is vertical and whose upper end terminates at the center of the sphere 101. The lower end 112 of the leg 100 corresponds to the location of the observer on the ground (the observer's foot location). This facilitates measurements by placing the user icon on a horizontal surface such as the ground, to determine the vertical offset of the viewpoint above the surface, thereby providing a more realistic view. The user icon leg 100 may be made invisible during mensuration.

In addition, the distance between the icon foot 112 and the icon head 101 may be made adjustable, rather than fixed. The icon can then be used to approximate human viewing characteristics, by placing the icon in a standing position on a surface in the scene (e.g. on the sidewalk), and looking outward from some distance above the surface.

It should be noted that the variable height or size of the user icon does not affect its ability to be translated up or down any amount in the scene (as using joystick controls, as described previously). Also, the length of the icon leg is not limited to a human range or dimensions.

Although the reduced complexity user icon shown in FIGS. 28 and 29 has an artificial appearance, the above-described features may be incorporated into a much more 'human'-looking iconic representation. Such a shape may provide the additional benefit of a familiar scale of reference, that the human user could employ as an additional visual cue, to aid in estimating the sizes of objects within the scene. The user icon may also be employed for navigation under mouse control and for mensuration.

When conducting mensuration, in addition to moving the user location, orientation interactively with the mouse input device, dimensions of features within the image viewed by the user in the main viewport can be measured. This is accomplished by activating mensuration mode (through the selection of a displayed menu item).

Figure 30:
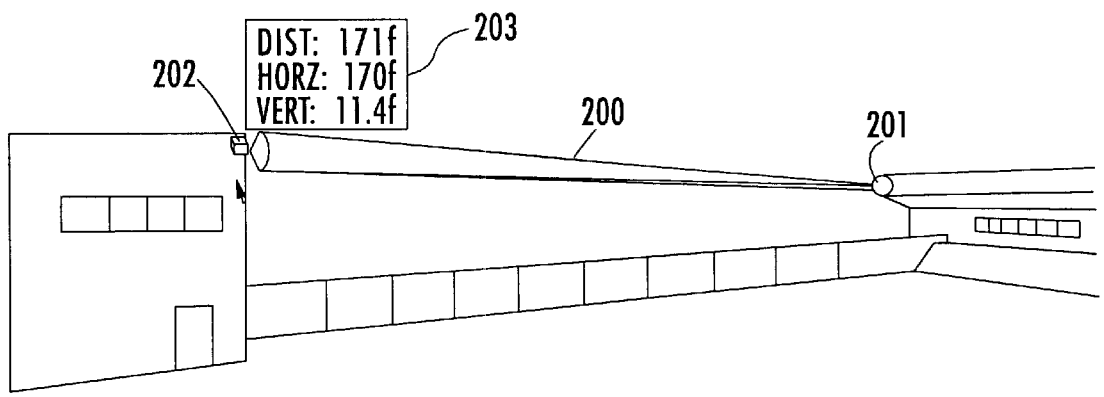
FIG. 30 is a pictorial in-scene diagram associated with mensuration mode of operation of the invention.

In this mode, as shown in FIG. 30, moving the user location/orientation interactively allows the user to select respective proxy vantage and look-at points 201 and 202. During the selection process, a mensuration icon 200 is displayed between the proxy vantage and look-at points. In addition, as shown by a parameter box 203, the display is operative to show parametric values associated with distance between the proxy vantage and look-at points, change in horizontal distance, and change in elevation next to the mouse pointer. Upon completion of the proxy viewpoint specification, the user's viewpoint does not change, as when moving to a new location. This allows the user to measure additional features within the displayed 3D image.

Advantages of the mensuration feature of the invention include the use of a only single press/drag/release mouse operation to allow the user to measure any feature that can be seen within the 3D scene from the main viewport. (It is intuitively easier to measure the distance between objects, since the proxy vantage and look-at points are 'stuck' to the model.) Displaying a mensuration icon provides the user with visual feedback of what is being measured, along with distance information aligned with the mouse pointer. This enables the user to focus on the mensuration technique, without having to look elsewhere for the distance information. The same mensuration menu item may be used to place the user back into the normal viewpoint selection mode.

In accordance with a further load management feature of the invention objects within the 3D scene may be selectively included in the scene. The exclusion of an object may be due to the fact that it occludes one or more other objects or lines of sight to other parts of the scene. Also, an object may be distracting or detrimental to understanding important aspects of the scene. Further, an object may place an extra burden on the image generation hardware and software, which reduces the performance of the system. In accordance with this feature of the invention, and object may be 'grown' from a (ground) surface of the scene, as diagrammatically illustrated by the growth of a building to full size as shown at 3101–3104 in the model unit growth diagram of FIG. 31, or it may be 'translated' vertically from a location beneath the ground surface into the scene, as shown diagrammatically by the vertical translation of an already full sized building as shown at 3201–3204 in FIG. 34.

Pursuant to this load management mode, using the mouse as an interface device, the user may select one or more 3D model units (e.g., buildings or city blocks of buildings) to load, by placing the mouse pointer on a point on the ground surface and clicking the right mouse button. This user action causes the geometry of the model unit to be loaded and displayed. Alternatively, the model unit may be displayed by selecting it from a scrolling list of model unit names. Once displayed, a model unit may be selectively removed from the scene by pointing at the object and clicking the right mouse button, or again by selecting it from a scrolling list of model unit names.

Figure 33:
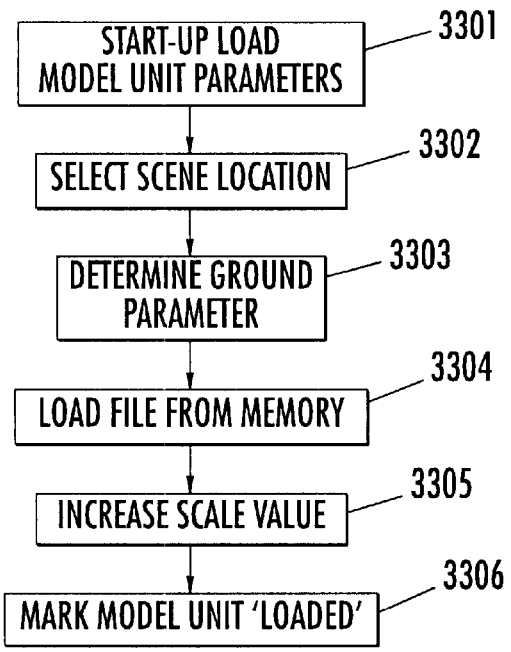
FIG. 33 shows a flow chart of the routine employed to grow-load a model unit into a displayed image.

FIG. 33 shows a flow chart of the routine employed to grow-load a model unit. At system start-up, in step 3301, a list of three items containing the following model unit parameter information is loaded: 1—the name of the model unit to be displayed in the scrolling list; 2—a ground perimeter which describes the 'clickable' region on the ground that will load or unload the model unit (this is typically but not necessarily where the model unit will appear); and 3—the system name of the file containing the model unit description. In step 3302 the user clicks on a scene (e.g., ground) location using the right mouse button.

In response to this location information, in step 3303 a determination is made in which ground perimeter, if any, the selected ground location lies. In step 3304, if the selected point falls within a ground perimeter, and the associated model unit has not been loaded, the file is loaded from memory (e.g., disc), but not yet displayed. It is preferred that the model unit coordinate system origin be at or slightly below ground level, so that the model unit (e.g., building) will appear to rise out of the ground as it is grown. (If the origin is above ground level the model unit will seem to 'float' in mid air, and appear to extend upward and downward as it is grown.) Also, the initial vertical scale of the model unit is set to zero (as shown at 3101 in FIG. 31).

Figure 31:
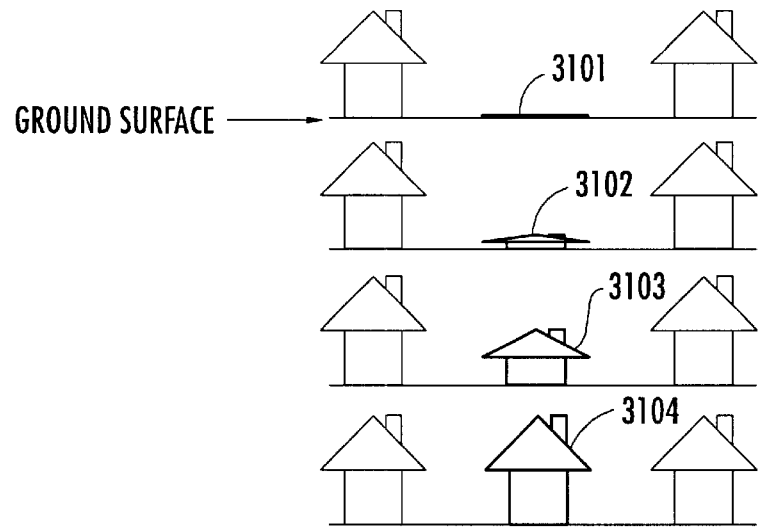
FIG. 31 is a growth diagram of gradual animated introduction of a model unit into a displayed scene.

In step 3305, the interpolator increases the scale value of the model unit towards unity or full scale, and thereby causes the geometry of the model unit to be gradually introduced into the scene in an animated manner, as shown at 3102–3104 in FIG. 31. During this increase in scale value, the interpolator may employ a simple constant rate of change of scale value to achieve linear scaling and a constant growth of the model unit. Once the model unit has reached full scale it is marked as 'loaded' in step 3306.

Figure 34:
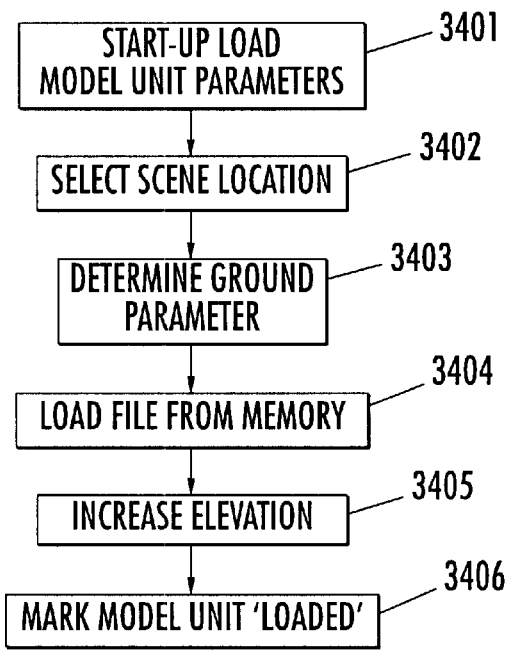
FIG. 34 shows a flow chart of the routine employed to translate-load a model unit into a displayed image.

FIG. 34 shows a flow chart of the routine employed to translate-load a model unit. At system start-up, step 3401 loads the same list of three items loaded in step 3301 of the routine of FIG. 33. In step 3402, the user clicks on a ground location using the right mouse button. In response to this location information, in step 3403 a determination is made in which ground perimeter, if any, the selected ground location lies. In step 3404, if the selected point falls within a ground perimeter, and the associated model unit has not been loaded, the file is loaded from memory (e.g., disc), but not yet displayed.

It is again preferred that the model unit coordinate system origin be at or slightly below ground level, so that the model unit (e.g., building) will appear to rise out of the ground as it is vertically translated and loaded into the scene. Also, the initial rate of change of elevation of the model unit is set to zero (as shown at 3201 in FIG. 32). In step 3405, the interpolator increases the rate of change of elevation of the model unit to a fixed value and initiates the translation of the model unit out of the ground.

Figure 32:
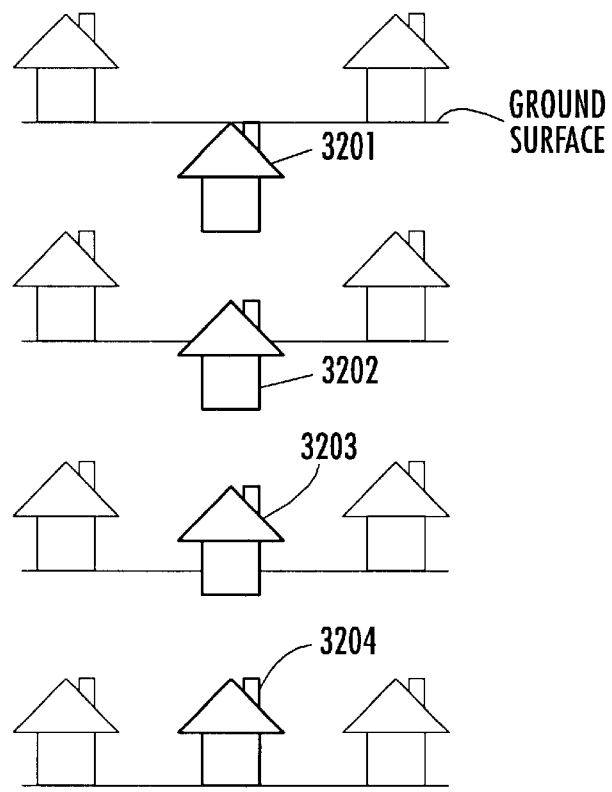
FIG. 32 is a model unit translation diagram of gradual animated translation of a model unit into a displayed scene.

The model unit then begins being translated vertically out of the ground and thereby gradually introduced into the scene in an animated manner, as shown at 3202–3204 in FIG. 32. During this increase in elevation value, the interpolator may employ a simple constant rate of change of elevation to achieve linear and constant vertical translation of the model unit into the scene. Once the base of the model unit has reached ground level, the model is at its full height in the scene and is marked as 'loaded' in step 3406.

As pointed out above, a displayed model unit may be selectively removed from the scene by pointing at the object and clicking the right mouse button, or by selecting it from a scrolling list of model unit names. When a model unit is 'unloaded' in this manner, it is gradually animated out of the scene by reversing the steps of the routine (either of those shown in FIGS. 31–34) through which it was introduced into the scene. The geometry of the unloaded model unit need not be discarded; instead, it may simply be made invisible until it is to be redisplayed.

As will be appreciated from the foregoing description, by controllably rendering and displaying multiple (swappable) aspect and size views of a three-dimensional geometric model, the present invention not only surpasses the limited capabilities of conventional three-dimensional model display system, but facilitates navigation and mensuration within the virtual world of the in-scene view of the displayed image.

While we have shown and described various embodiments of the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed is:

1. A method of displaying and manipulating an image of a three-dimensional (3D) geometric model of an object, such as an urban scene, comprising the steps of:
    (a) simultaneously displaying, in a first display window of a digital image display system, a first image of said object that presents said object from a first 3D model perspective and, in a second display window of said digital image display system, a second image of said object that presents said object from a second 3D model perspective, different from said first 3D model perspective; and
    (b) simultaneously performing an effectively continuous transition of the image contents of said first display window from said first 3D model perspective of said object toward said second 3D model perspective of said object, and an effectively continuous transition of image contents of said second display window from said second 3D model perspective of said object toward said first 3D model perspective of said object.

2. A method according to claim 1, wherein said first 3D model perspective presents an overview image of said object from a first distance map perspective, and said second 3D model perspective presents an in-scene image of said object from a second distance perspective, closer to said object than said first distance map perspective.

3. A method according to claim 2, further including the step of:
    (c) manipulating said in-scene image of said object in a manner that displays movement through said in-scene image from a perspective different from said overview image of said object.

4. A method according to claim 1, further including the step (c) of, during step (b), controllably reversing said effectively continuous transition of image contents of said first display window, and said effectively continuous transition of image contents of said inset viewport display window.

5. A method according to claim 1, wherein step (b) includes using an interpolation mechanism to cause effectively smooth transitions of said first and second images of said object.

6. A method according to claim 1, wherein step (a) further comprises controllably introducing, in a successive animated manner, images of a selected portion of said three-dimensional (3D) geometric model of said object into said first and second display windows of said digital image display device, in accordance with object model introduction representative signal inputs from said user interface.

7. A method of displaying and manipulating an image of a three-dimensional (3D) geometric model of an object, such as an urban scene, comprising the steps of:
    (a) displaying, in an overview viewport display window of a digital image display system, a first image of said object that presents said object from a first 3D model perspective, said overview viewport display window having a first display area;
    (b) displaying, in an inset viewport display window of said digital image display system, a second image of said object that presents said object from a second 3D model perspective, different from said first 3D model perspective, said inset viewport display window having a second display area different than said first display area; and
    (c) navigating through said second image of said object, so as to manipulate said second image of said object displayed in said inset viewport display window.

8. A method according to claim 7, wherein step (c) includes displaying a virtual user icon within said second image, and operating a user interface of said digital image display system in a manner that is effective to manipulate the 3D location and/or orientation of said virtual user icon within said second image.

9. A method according to claim 8, wherein step (c) includes in response to operation of said user interface to manipulate said 3D location and/or orientation of said virtual user icon within said second image, displaying movement through said second image, from a first in-scene viewing location to a second in-scene viewing location of said second 3D model perspective of said object.

10. A method according to claim 9, wherein step (c) comprises operating said user interface to locate said second user viewing location in said second image, locating a look-at location in said second image so as to define said second in-scene viewing direction from said second user viewing location in said second image of said second 3D model perspective of said object, and thereafter effecting movement through said second image, from said first user viewing location to said second user viewing location, while displaying said look-at location of said second image as viewed while traveling along a navigation path from said first user viewing location to said second user viewing location.

11. A method according to claim 8, wherein said virtual user icon is configured to simulate a user's head at a user viewing location, viewing direction including a line-of-sight therefrom, and a look-at point at a viewed location in said second image of said object.

12. A method according to claim 11, wherein said virtual user icon is configured to simulate a distance of said user's head above a surface of said object upon which said virtual user icon is placed.

13. A method according to claim 11, wherein said distance of said user's head above a surface of said object upon which said virtual user icon is placed is adjustable.

14. A method according to claim 7, wherein step (c) includes using an interpolation mechanism to manipulate said second image of said object so as to display a gradual continuous movement of said second image as viewed from different user locations of said second 3D model perspective of said object.

15. A method according to claim 7, wherein step (a) comprises maintaining said first image of said object in a fixed display orientation while navigating through said second image of said object in step (c).

16. A method according to claim 15, wherein said object comprises an urban region and said second image of said object comprises a generally street level image of said urban region.

17. A method according to claim 7, further including step (d) of performing an effectively continuous transition of image contents of said overview viewport display window from an overview image of said object having a first distance perspective, toward an in-scene image of said object having a second distance perspective, that is closer to said object than said first distance perspective, while simultaneously performing an effectively continuous transition of image contents of said inset viewport display window from said in-scene image of said object toward said overview image of said object.

18. A method according to claim 17, further including step (e) of, during step (d), controllably reversing said effectively continuous transition of image contents of said overview viewport display window toward said in-scene image, and said effectively continuous transition of image contents of said inset viewport display window from said in-scene image of said object toward said overview image of said object.

19. A method according to claim 7, wherein step (c) further includes measuring dimensions of features within said second image using a mensuration icon that interconnects respective look-from and look-at points in said second image.

20. A method according to claim 7, wherein steps (a) and (b) further comprise controllably introducing, in a successive animated manner, different views of a selected portion of said first and second images of said three-dimensional (3D) geometric model of said object into said overview and inset viewports of said digital image display device, in accordance with object model introduction representative signal inputs from said user interface.

21. A virtual user icon for a display and manipulation of a image of a three-dimensional (3D) geometric model of an object, such as an urban scene, in a display window of a digital image display system, comprising a viewpoint element that is configured to simulate a user's head at a user viewing location in said image, a viewing direction indicator including a line-of-sight therefrom, and a look-at point element positionable at a viewed location in said image.

22. A virtual user icon according to claim 21, wherein said icon is further configured to simulate a distance of said user's head above a surface of said object upon which said icon is placed in said image.

23. An image processing system comprising:
a digital image display device;
a digital image processor which is operative to operate upon a three-dimensional (3D) geometric model of an object, such as an urban scene, and to controllably display multiple images of said object upon said digital image display device; and
a user interface coupled to said digital image processor and being operative under user control to supply image manipulation signals to said digital image processor for causing the manipulation of images displayed upon said digital image display device; and wherein
said digital image processor is operative to simultaneously display in a first display window of a digital image display device a first image of said object that presents said object from a first 3D model perspective, and to display in a second display window of said digital image display system a second image of said object that presents said object from a second 3D model perspective, different from said first 3D model perspective and, in response to a first prescribed operation of said user interface, to simultaneously cause an effectively continuous transition of the image contents of said first display window from said first 3D model perspective of said object toward said second 3D model perspective of said object, and an effectively continuous transition of image contents of said second display window from said second 3D model perspective of said object toward said first 3D model perspective of said object.

24. An image processing system according to claim 23, wherein said digital image processor is operative, in response to a second prescribed operation of said user interface, to controllably reverse said effectively continuous transition of image contents of said first display window, and said effectively continuous transition of image contents of said inset viewport display window.

25. An image processing system according to claim 23, wherein said first 3D model perspective presents an overview image of said object from a first distance perspective, said second 3D model perspective presents an in-scene image of said object from a second distance perspective, closer to said object than said first distance perspective.

26. An image processing system according to claim 25, wherein said digital image processor is operative to manipulate said in-scene image of said object in a manner that displays movement through said in-scene image from a perspective different from said overview image of said object.

27. An image processing system according to claim 26, wherein said digital image processor is operative to cause said display device to display a virtual user icon within said in-scene image, and to manipulate the 3D location and/or orientation of said virtual user icon within said in-scene image in accordance with operation of said user interface.

28. An image processing system according to claim 23, wherein said display device maintains said overview image of said object in a fixed display orientation during navigation through said in-scene image of said object.

29. An image processing system according to claim 23, wherein said digital image processor is controllably operative to introduce, in a successive animated manner, views of a selected portion of said three-dimensional (3D) geometric model of said object into said first and second display windows of said digital image display device, in accordance with object model introduction representative signal inputs from said user interface.

30. An image processing system comprising:
a digital image display device;
a digital image processor which is operative to operate upon a three-dimensional (3D) geometric model of an object, such as an urban scene, and to controllably display multiple images of said object upon said digital image display device; and
a user interface coupled to said digital image processor and being operative under user control to supply image manipulation signals to said digital image processor for causing the manipulation of images displayed upon said digital image display device; and wherein
said digital image display device contains an overview viewport display window displaying a first image of said object that presents said object from a first 3D model perspective, said overview viewport display window having a first display area, and an inset viewport display window displaying a second image of said object that presents said object from a second 3D model perspective, different from said first 3D model perspective, said inset viewport display window having a second display area different than said first display area; and
said digital image processor is controllably operative to navigate through said second image of said object in accordance with navigation signal inputs from said user interface, so as to manipulate said second image of said object displayed in said inset viewport display window.

31. An image processing system according to claim 30, wherein said digital image processor is operative to cause said digital image display device to display a virtual user icon within said second image, and to manipulate the 3D location and/or orientation of said virtual user icon within said second image in response to operation of said user interface, and thereby display movement through said second image, from a first in-scene viewing location to a second in-scene viewing location of said second 3D model perspective of said object.

32. An image processing system according to claim 30, wherein said digital image processor is operative to execute an interpolation mechanism to manipulate said second image of said object so as to display a gradual continuous movement of said second image as viewed from different user locations of said second 3D model perspective of said object.

33. An image processing system according to claim 32, wherein said virtual user icon is configured to simulate a user's head at a user viewing location, viewing direction including a line-of-sight therefrom, and a look-at point at a viewed location in said second image of said object.

34. An image processing system according to claim 33, wherein said virtual user icon is configured to simulate a distance of said user's head above a surface of said object upon which said virtual user icon is placed.

35. An image processing system according to claim 33, wherein said distance of said user's head above a surface of said object upon which said virtual user icon is placed is adjustable.

36. An image processing system according to claim 30, wherein said digital image processor is operative to cause said display device to display a mensuration icon that interconnects respective look-from and look-at points in said second image.

37. An image processing system according to claim 30, wherein said digital image processor is operative to cause an effectively continuous transition of image contents of said overview viewport display window from an overview image of said object having a first distance perspective, toward an in-scene image of said object having a second distance perspective, that is closer to said object than said first distance perspective, while simultaneously causing an effectively continuous transition of image contents of said inset viewport display window from said in-scene image of said object toward said overview image of said object.

38. An image processing system according to claim 37, wherein said digital image processor is operative, in response to a second prescribed operation of said user interface, to controllably reverse said effectively continuous transition of image contents of said overview viewport display window toward said in-scene image, and said effectively continuous transition of image contents of said inset viewport display window from said in-scene image of said object toward said overview image of said object.

39. An image processing system according to claim 30, wherein said digital image processor is controllably operative to introduce, in a successive animated manner, views of a selected portion of said three-dimensional (3D) geometric model of said object into said overview and inset viewports of said digital image display device, in accordance with object model introduction representative signal inputs from said user interface.

40. An image processing system comprising:
a digital image display device;
a digital image processor which is operative to process a three-dimensional (3D) geometric model of an object, such as an urban scene, and to controllably display an image of said object within a viewport of said digital image display device; and
a user interface coupled to said digital image processor and being operative under user control to supply image manipulation signals to said digital image processor for causing the manipulation of an image displayed within said viewport of said digital image display device; and wherein
said digital image processor is controllably operative to introduce, in a successive animated manner, at least one selected portion of said three-dimensional (3D) geometric model of said object, into said viewport of said digital image display device, in accordance with object model introduction representative signal inputs from said user interface.

41. An image processing system according to claim 40, wherein said digital image processor is operative to controllably grow, at a prescribed location of said viewport of said digital image display device, and in said successive animated manner, said at least one selected portion of said three-dimensional (3D) geometric model of said object from a first size to a second size, in response to said object model introduction representative signal inputs from said user interface.

42. An image processing system according to claim 40, wherein said digital image processor is operative to controllably translate into a prescribed location of said viewport of said digital image display device, and in a successive animated manner, said at least one selected portion of said three-dimensional (3D) geometric model of said object, in response to said object model introduction representative signal inputs from said user interface.

43. An image processing system according to claim 40, wherein said digital image display device contains an overview viewport display window displaying a first image of said object that presents said object from a first 3D model perspective, said overview viewport display window having a first display area, and an inset viewport display window displaying a second image of said object that presents said object from a second 3D model perspective, different from said first 3D model perspective, said inset viewport display window having a second display area different than said first display area, and wherein said digital image processor is controllably operative to introduce, in said successive animated manner, different views of said at least one selected portion of said three-dimensional (3D) geometric model of said object into said overview and inset viewports of said digital image display device, in accordance with said object model introduction representative signal inputs from said user interface.

44. An image processing system according to claim 40, wherein said digital image processor is operative to execute an interpolation mechanism to successively introduce said at least one selected portion of said three-dimensional (3D) geometric model of said object into said viewport of said digital image display device.

45. An image processing system according to claim 40, wherein said digital image processor is operative to controllably remove, in a successive animated manner, at least one prescribed portion of said three-dimensional (3D) geometric model of said object displayed by digital image display device.

46. An image processing system according to claim 40, wherein said digital image processor is operative to controllably remove, in a successive animated manner, said at least one selected portion of said three-dimensional (3D) geometric model of said object that has been introduced into and displayed by digital image display device.

* * * * *